United States Patent
Mori et al.

(10) Patent No.: US 7,274,161 B2
(45) Date of Patent: Sep. 25, 2007

(54) MOTOR DRIVING APPARATUS

(75) Inventors: Hideaki Mori, Nishinomiya (JP);
Shinichi Kuroshima, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 47 days.

(21) Appl. No.: 11/123,509

(22) Filed: May 6, 2005

(65) Prior Publication Data

US 2005/0258788 A1    Nov. 24, 2005

(30) Foreign Application Priority Data

May 18, 2004    (JP)    ............. 2004-147226

(51) Int. Cl.
*H02K 21/00*    (2006.01)
(52) U.S. Cl. .............. 318/254; 318/721; 318/823; 318/608; 318/799
(58) Field of Classification Search .............. None
See application file for complete search history.

(56) References Cited

U.S. PATENT DOCUMENTS 5,923,133 A * 7/1999 Menegoli .............. 318/254

6,661,192 B2 * 12/2003 Copeland .............. 318/439

FOREIGN PATENT DOCUMENTS

| JP | 04109891 A | 4/1992 |
|---|---|---|
| JP | 04-308495 | 10/1992 |
| JP | 07087783 A | 3/1995 |
| JP | 2000-324873 | 11/2000 |
| JP | 2002-374690 | 12/2002 |
| JP | 2004-048928 | 2/2004 |

* cited by examiner

*Primary Examiner*—Lincoln Donovan
*Assistant Examiner*—Renata McCloud
(74) *Attorney, Agent, or Firm*—Akin Gump Strauss Hauer & Feld LLP

(57) ABSTRACT

A Motor driving apparatus adjusts activation start timing of high-side activation control signals UU, VU, WU and the low-side activation control signals UL, VL, and WL with a state determination signal SJ in an activation controller 40, in the period from starting to the time when rotor rotating speed reaches a predetermined value, sets the activation start timing earlier than in normal times to perform leading phase activation control, and in normal times when the rotor rotating speed is a predetermined value or more, controls activation start timing in efficient and optimum phase. Hence, the motor driving apparatus can carry out stable PWM sensorless starting without any starting failure such as oscillation, loss of synchronism and reverse rotation and shorten starting time.

16 Claims, 24 Drawing Sheets

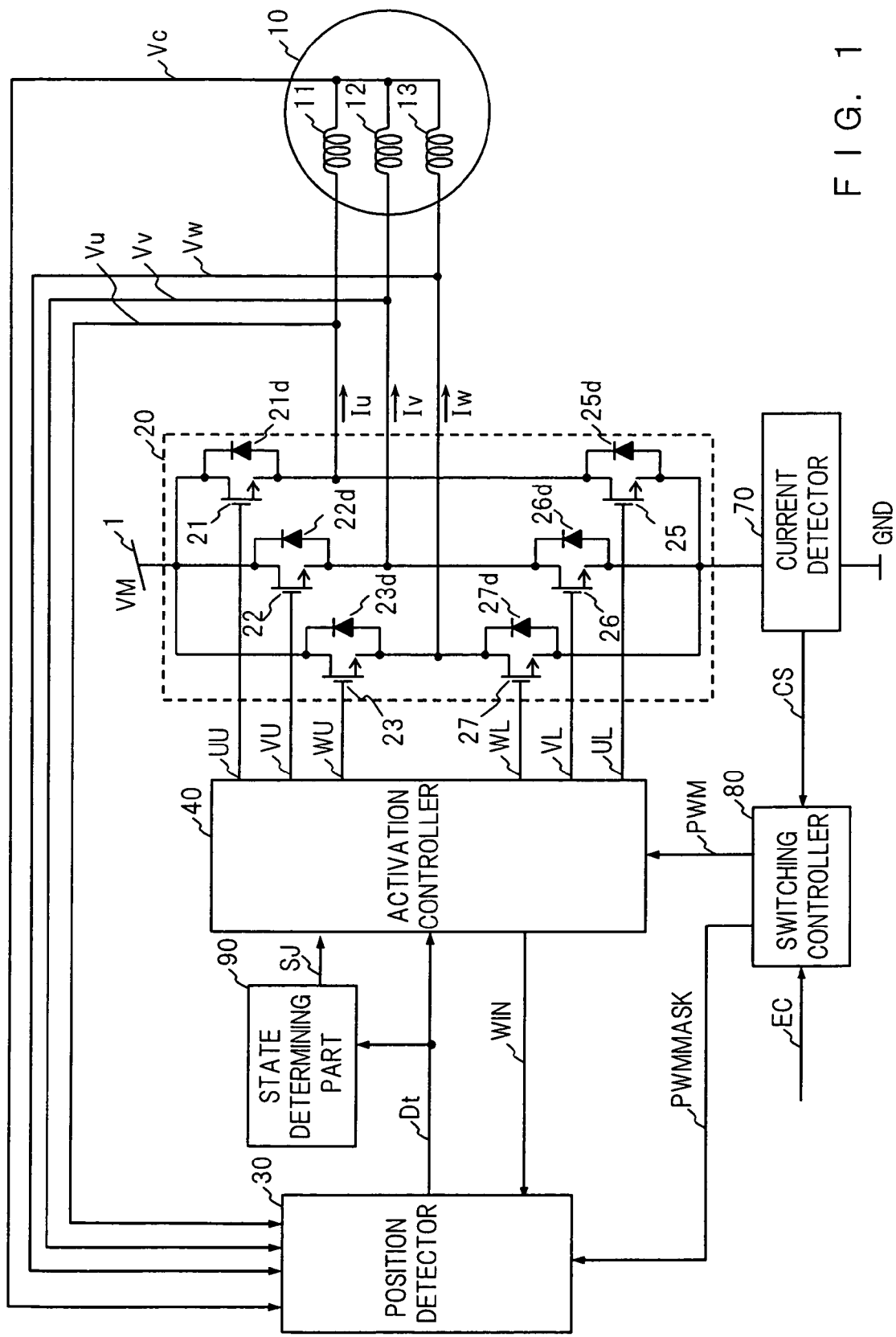
F I G. 1

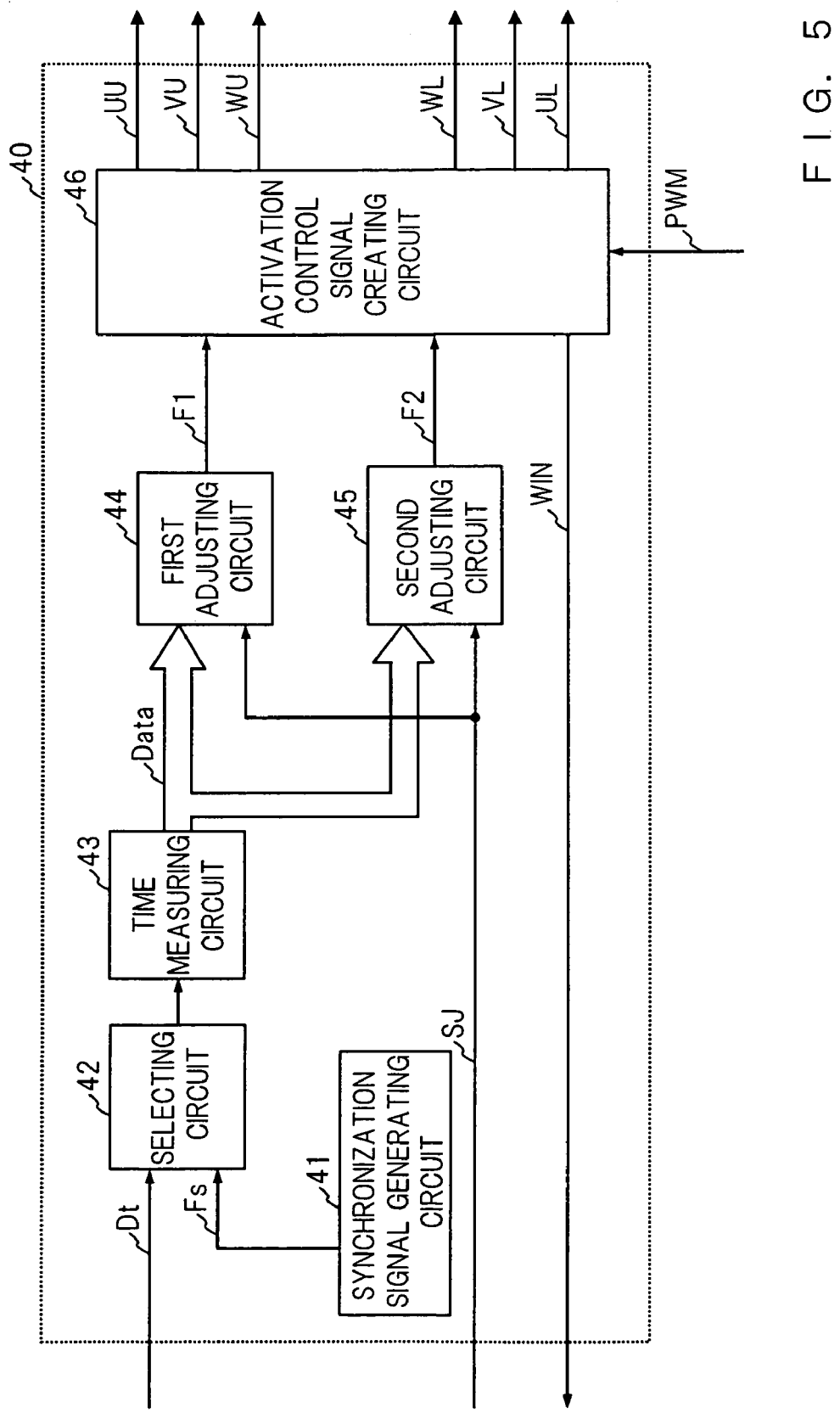
F I G. 5

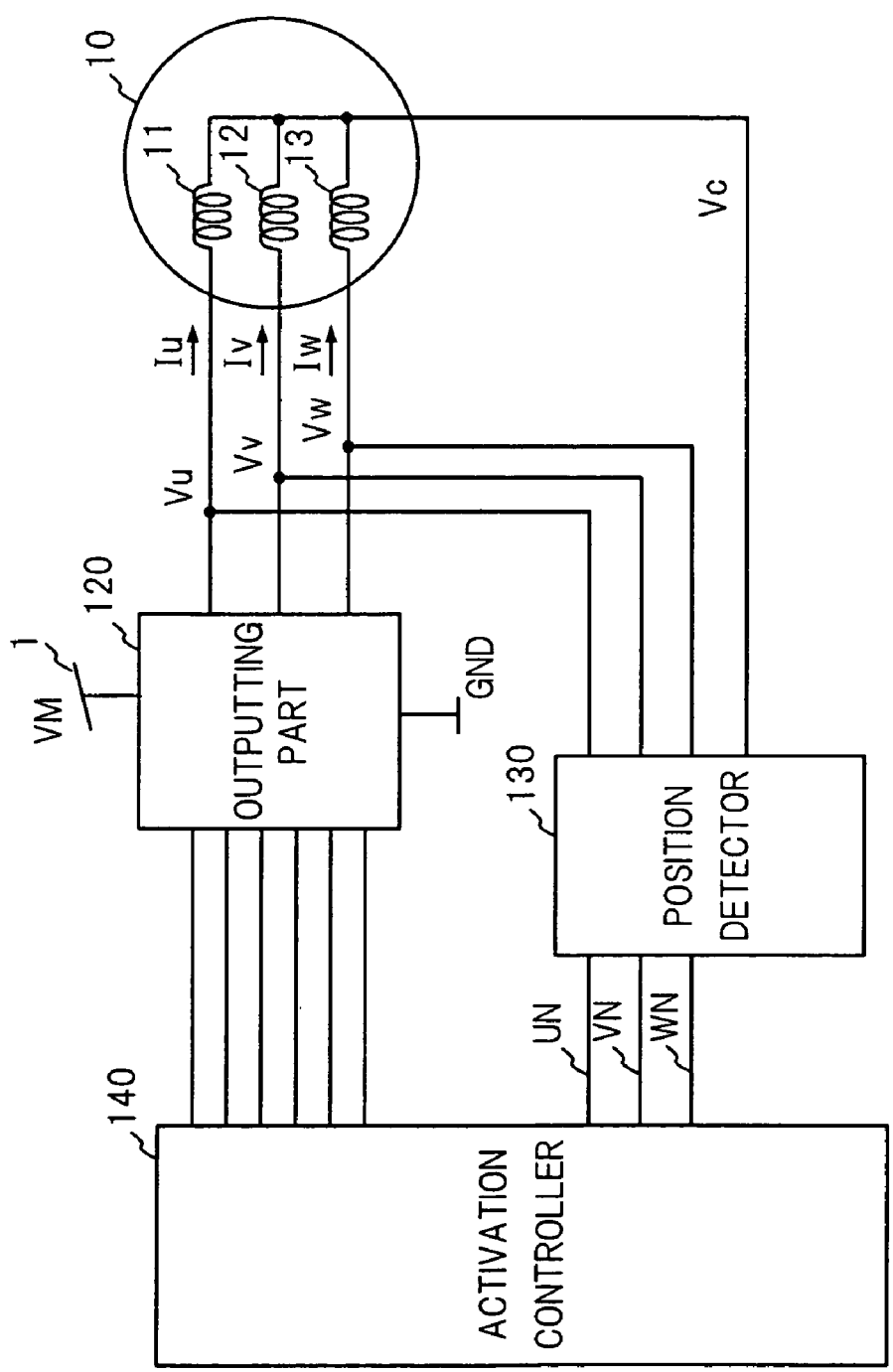
F I G. 2 2

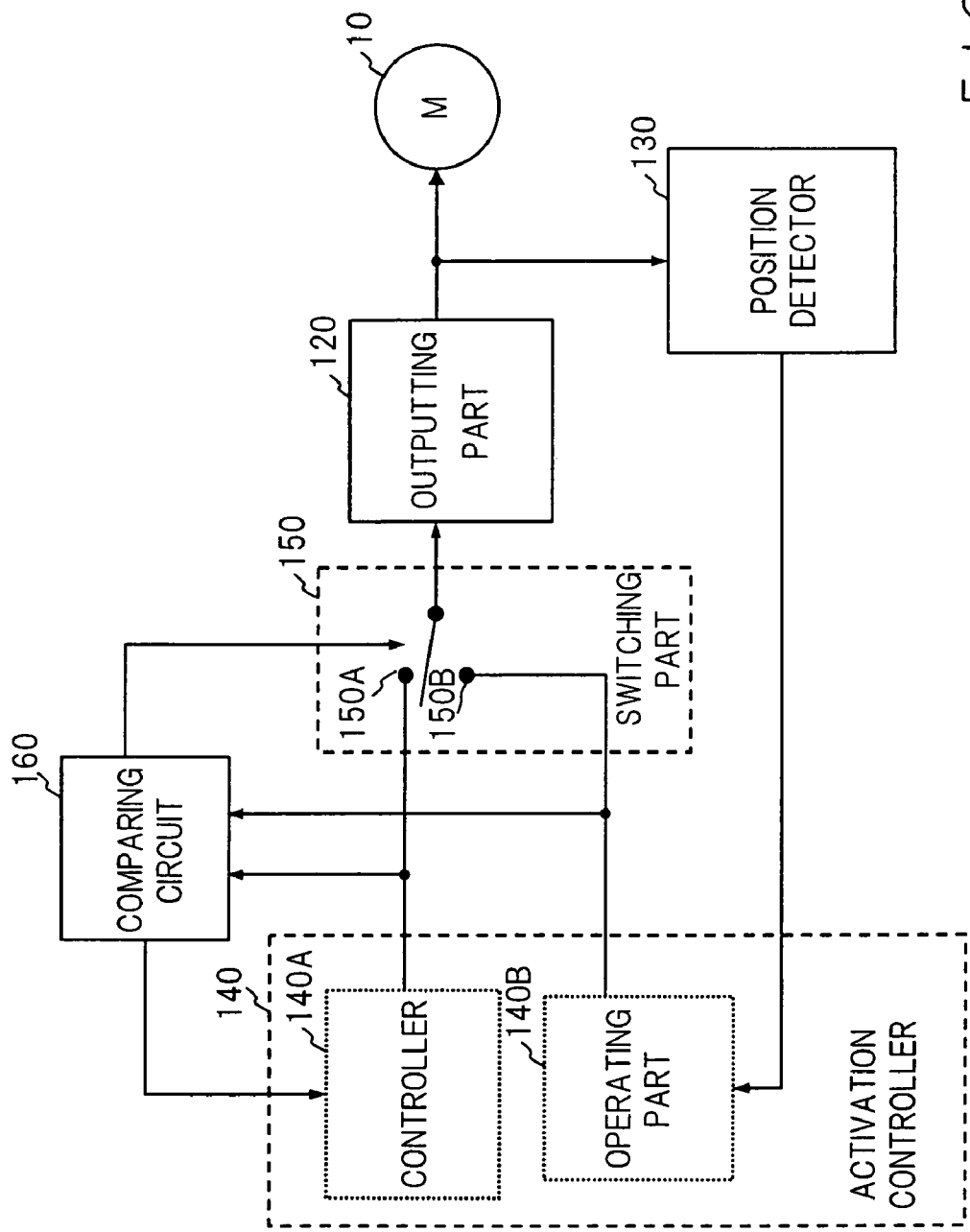
F I G. 24

MOTOR DRIVING APPARATUS

BACKGROUND OF THE INVENTION

This invention relates to a motor driving apparatus which detects zero-crossing of back electromotive forces generated in a non-activation phase (open phase) in windings to perform position sensorless PWM driving of the motor, in particular, a starting control method in the motor driving apparatus.

In recent years, a brushless motor has been generally employed to drive a recording medium such as a hard disk and an optical disk, or a fan, a compressor and the like in air conditioning equipment. For a wide range of variable speed control or reduction in electricity consumption, such brushless motor is driven by PWM operation by using an inverter device. In the brushless motor having three-phase windings, to detect position of a magnetic pole of the rotor, position sensors such as Hall devices are generally arranged every 120 degrees of electrical angle. In opposition to the brushless motor having such position sensors, for the purpose of reducing costs and size, there is a demand for a brushless motor without position sensor and various sensorless driving techniques have been developed. Means of realizing sensorless driving include a method of performing 120-degree activation in electrical angle and detecting zero-crossing of the back electromotive forces generated in the non-activation phase (open phase). 120-degree activation means that the width of activation has an electrical angle of 120 degrees.

FIG. 22 is a block diagram showing a conventional motor driving apparatus which performs sensorless driving. In FIG. 22, a motor 10 is comprised of a rotor having a field part formed of a permanent magnet (not shown) and a stator in which three-phase windings 11, 12 and 13 are Y-connected. An outputting part 120 is disposed between a power supply 1 and the ground (GND) and bridge configuration is achieved by three high-side power transistors and three low-side power transistors to supply electric power to the three-phase windings 11, 12 and 13. By comparing three-phase terminal voltages Vu, Vv, and Vw with a center tap voltage Vc, a position detector 130 detects the position of the rotor and outputs position detection signals UN, VN and WN to an activation controller 140 comprised of a CPU. The activation controller 140 outputs high-side activation control signals UU, VU and WU and low-side activation control signals UL, VL, and WL for controlling each power transistor of the outputting part 120 according to the position detection signals UN, VN and WN and performs activation timing control of the three-phase windings 11, 12 and 13. Sensorless driving of the motor 10 is performed by the motor driving apparatus thus configured.

FIG. 23 is a timing chart showing operation of each part of the motor driving apparatus having the configuration as shown in FIG. 22. In FIG. 23, waveforms Eu, Ev and Ew are waveforms of the three-phase back electromotive forces and waveforms UN, VN and WN represent the position detection signals. The position detection signals UN, VN and WN are results obtained by comparing the three-phase terminal voltages Vu, Vv, and Vw with the center tap voltage Vc, respectively, each having an edge at zero-crossing points of the waveforms of the three-phase back electromotive forces Eu, Ev and Ew, respectively. Waveforms UU and UL are the high-side control signal and the low-side control signal of the U-phase upper and lower power transistors in the outputting part 120. A waveform Iu is a drive current flowing to the U-phase winding.

The activation controller 140 measures rotor rotating speed from rotor position detected by the position detection signals UN, VN and WN and rate of change in speed and calculates a delay time corresponding to an electrical angle of 30 degrees. Activation control is performed at the timing according to this delay time to output the high-side activation control signals UU, VU and WU and the low-side activation control signals UL, VL and WL. By controlling activation timing in this manner, the conventional motor driving apparatus performs motor driving control.

The motor driving apparatus which calculates the delay time corresponding to an electrical angle of 30 degrees on the basis of the position detection signals UN, VN and WN and performs activation control at the timing according to the calculated delay time as described above is disclosed in, for example, an Official Gazette of Japanese Patent Publication No. 2778816.

FIG. 24 is a block diagram showing a configuration of another conventional motor driving apparatus. The activation controller 140 formed of a CPU comprises a controller 140A and an operating part 140B. Outputs of the controller 140A and the operating part 140B are switched by a switch of a switching part 150 and sent to the outputting part 120 as activation control signals. The outputting part 120 supplies electric power to the motor 10 according to the activation control signals. The position detector 130 detects a rotor position and outputs the position detection signals indicating the rotor position to the operating part 140B. The outputs of the controller 140A and the operating part 140B are input also to a comparing circuit 160, and a phase difference between both signals is detected and output to the controller 140A and the switching part 150.

Operation of the motor driving apparatus thus constituted shown in FIG. 24 will be briefly described.

The controller 140A outputs a synchronization signal for performing synchronous operation, and accordingly the motor 10 is started to perform synchronous operation. When the rotor starts rotating, the position detector 130 detects rotor position by back electromotive forces and the operating part 140B outputs the activation control signal according to the position detection signals. The comparing circuit 160 detects a phase difference between the synchronization signal of the controller 140A and the activation control signal of the operating part 140B, and when the phase difference falls within a predetermined value, the switch of the switching part 150 is switched from a terminal 150A to a terminal 150B. That is, synchronous operation is switched to position detection driving. A phase difference detection signal is fed back to the controller 140A and the synchronization signal of the controller 140A is corrected so that phase difference may fall within the predetermined value in the comparing circuit 160.

As described above, the conventional motor driving apparatus in which the phase difference between the synchronization signal and the activation control signal according to the position detection signal is detected, and at the time when the phase difference falls within the predetermined value, synchronous operation is switched to position detection driving, is disclosed in, for example, the Official Gazette of Japanese Unexamined Patent Publication No. Hei 7-87783.

In the conventional motor driving apparatus thus configured, sensorless driving is performed by generating the activation control signals on the basis of the position detection signals using back electromotive forces. In such a method, when the rotor rotating speed is slow, for example, at starting, the position detection signals include many detection errors since back electromotive forces is small, etc. That is, since displacement in the detected phase arises with respect to the real phase which should be detected, there is a problem that a starting failure such as oscillation, loss of synchronism and reverse rotation may be caused depending on the initial rotor position, or even if the rotor rotates in the normal direction, sufficient starting torque cannot be obtained, thereby making starting time longer. Especially in driving of the motor for information equipment such as an optical disk, reduction in starting time has been strongly desired and stable sensorless starting in sensorless driving is an absolute requirement.

To solve the above-mentioned problem, the present invention intends to provide a motor driving apparatus which can carry out stable PWM sensorless starting without any starting failure such as oscillation, loss of synchronism and reverse rotation and shorten starting time.

SUMMARY OF THE INVENTION

A motor driving apparatus in accordance with a first aspect of the present invention has a motor having plural-phase windings and a rotor;

a position detecting means for detecting position of the above-mentioned rotor according to a comparison signal obtained by comparing terminal voltages of the above-mentioned windings in a non-activation phase (open phase) with a center tap voltage of a common potential of the above-mentioned plural-phase windings and outputting a position detection signal;

an activation controlling means for performing activation control of the above-mentioned windings by setting leading phase of a leading phase activation control signal with respect to the above-mentioned position detection signal at starting and performing activation control of the above-mentioned windings according to the above-mentioned position detection signal in normal times; and a switching controlling means for outputting a drive signal (PWM signal) for performing high-frequency switching control according to a command signal to the above-mentioned activation controlling means. In the motor driving apparatus of the present invention thus configured, it becomes possible to improve starting torque and shorten starting time.

A motor driving apparatus in accordance with a second aspect of the present invention may be configured so that, in the configuration from the first aspect, a predetermined cycle OFF means for providing activation of the above-mentioned plural-phase windings with a predetermined cycle OFF period is further provided, and the above-mentioned position detecting means performs position detection in the above-mentioned predetermined cycle OFF period. With such configuration, stable PWM sensorless starting without any starting failure such as oscillation, loss of synchronism and reverse rotation becomes possible.

A motor driving apparatus in accordance with a third aspect of the present invention may be configured so that the above-mentioned position detecting means in the configuration from the first aspect generates a reversal comparison signal obtained by reversing the above-mentioned comparison signal and performs position detection according to the above-mentioned reversal comparison signal in a ON period of high-frequency switching control. With such configuration, stable PWM sensorless starting without any starting failure such as oscillation, loss of synchronism and reverse rotation becomes possible. Further, since predetermined cycle OFF is not applied, it becomes possible to improve starting torque and shorten starting time.

A motor driving apparatus in accordance with a fourth aspect of the present invention may be configured so that, in the configuration from the first aspect, a state determining means for determining rotation state of the above-mentioned rotor is further provided, and the above-mentioned activation controlling means cancels leading phase according to an output of the above-mentioned state determining means. With such configuration, stable PWM sensorless starting without any starting failure such as oscillation, loss of synchronism and reverse rotation becomes possible, and after cancellation of leading phase, PWM sensorless driving in the optimum phase in terms of efficiency can be performed.

A motor driving apparatus in accordance with a fifth aspect of the invention may be configured so that, in the configuration from the second aspect, a state determining means for determining rotation state of the above-mentioned rotor is further provided, the above-mentioned activation controlling means cancels leading phase according to an output of the above-mentioned determining means and stops a predetermined cycle OFF operation of said predetermined cycle OFF means, and the above-mentioned position detecting means performs position detection in an ON period or OFF period of high-frequency switching control. With such configuration, stable PWM sensorless starting without any starting failure such as oscillation, loss of synchronism and reverse rotation becomes possible, and after cancellation of leading phase, PWM sensorless driving in the optimum phase in terms of efficiency can be performed. Moreover, since predetermined cycle OFF is not applied, starting torque can be improved, thereby shortening starting time.

A motor driving apparatus in accordance with a sixth aspect of the present invention may be configured so that, in the configuration from the third aspect, a state determining means for determining rotation state of the above-mentioned rotor is further provided, the above-mentioned activation controlling means cancels leading phase according to an output of the above-mentioned determining means, and the above-mentioned position detecting means performs position detection according to the above-mentioned comparison signal. With such configuration, stable PWM sensorless starting without any starting failure such as oscillation, loss of synchronism and reverse rotation becomes possible, and after cancellation of leading phase, PWM sensorless driving in the optimum phase in terms of efficiency can be performed.

A motor driving apparatus in accordance with a seventh aspect of the present invention may be configured so that, in the configuration from one of the fourth to sixth aspects, said state determining means determines whether or not the above-mentioned rotor rotating speed obtained on the basis of the above-mentioned position detection signal exceeds a predetermined value. With such configuration, stable PWM sensorless starting without any starting failure such as oscillation, loss of synchronism and reverse rotation becomes possible, and after cancellation of leading phase, PWM sensorless driving in the optimum phase in terms of efficiency can be performed.

A motor driving apparatus in accordance with an eighth aspect of the present invention may be configured so that, in the configuration from one of the fourth to sixth aspects, the above-mentioned state determining means determines whether or not electrical cycle of the above-mentioned activation control signal is output a predetermined number of times or more. With such configuration, stable PWM sensorless starting without any starting failure such as oscillation, loss of synchronism and reverse rotation becomes possible, and after cancellation of leading phase, PWM sensorless driving in the optimum phase in terms of efficiency can be performed.

A motor driving apparatus in accordance with a ninth aspect of the present invention may be configured so that, in the configuration from one of the fourth to sixth aspects, the above-mentioned activation controlling means cancels leading phase linearly or gradually according to an output of the above-mentioned state determining means.

A motor driving apparatus in accordance with a tenth aspect of the present invention may be configured so that, in the configuration from one of the fourth to sixth aspects, the above-mentioned activation controlling means sets a second leading phase smaller than the leading phase of the above-mentioned activation control signal with respect to the above-mentioned position detection signal at starting, and after cancellation of leading phase according to the output of the state determining means, activation control in the second leading phase is performed.

A motor driving apparatus in accordance with an eleventh aspect of the present invention may be configured so that, in the configuration from the first aspect, the above-mentioned switching controlling means performs slope control so as to form the waveform of a drive current flowing to the above-mentioned plural-phase windings like a substantially trapezoidal wave. With such configuration, since waveform of the drive current is formed like a trapezoidal wave, stable PWM sensorless starting without any starting failure such as oscillation, loss of synchronism and reverse rotation, in which vibration and acoustic noise due to the waveform of the drive current can be reduced, becomes possible.

A motor driving apparatus in accordance with a twelfth aspect of the present invention may be configured so that, in the configuration from the eleventh aspect, said activation controlling means sets leading phase by controlling the slope control angles of substantially trapezoidal waveform of a current flowing to the above-mentioned plural-phase windings at rising and falling sides of a slope, respectively, at starting.

A motor driving apparatus in accordance with a thirteenth aspect of the present invention may be configured so that, in the configuration from the eleventh aspect, said activation controlling means sets leading phase by controlling the slope control angle of substantially trapezoidal waveform of a current flowing to the above-mentioned plural-phase windings smaller at starting. With such configuration, since further leading phase activation control can be performed while maintaining trapezoidal waveform of the drive current, starting torque can be improved, thereby shortening starting time.

A motor driving apparatus in accordance with a fourteenth aspect of the present invention may be configured so that, in the configuration from the thirteenth aspect, a predetermined cycle OFF means for providing activation of the above-mentioned plural-phase windings with a predetermined cycle OFF period is further provided, and the above-mentioned position detecting means performs position detection in the above-mentioned predetermined cycle OFF period. With such configuration, stable PWM sensorless starting without any starting failure such as oscillation, loss of synchronism and reverse rotation becomes possible.

A motor driving apparatus in accordance with a fifteenth aspect of the present invention may be configured so that the above-mentioned position detecting means in the configuration from the thirteenth aspect generates a reversal comparison signal obtained by reversing the above-mentioned comparison signal and performs position detection according to the above-mentioned reversal comparison signal in a ON period of high-frequency switching control. With such configuration, stable PWM sensorless starting without any starting failure such as oscillation, loss of synchronism and reverse rotation becomes possible. Further, since predetermined cycle OFF is not applied, it becomes possible to improve starting torque and shorten starting time.

A motor driving apparatus in accordance with a sixteenth aspect of the present invention may be configured so that, in the configuration from the thirteenth aspect, a state determining means for determining rotation state of the above-mentioned rotor is further provided, and the above-mentioned activation controlling means cancels leading phase according to an output of the above-mentioned state determining means. With such configuration, stable PWM sensorless starting without any starting failure such as oscillation, loss of synchronism and reverse rotation becomes possible, and after cancellation of leading phase, PWM sensorless driving in the optimum phase in terms of efficiency can be performed.

A motor driving apparatus in accordance with a seventeenth aspect of the invention may be configured so that, in the configuration from the fourteenth aspect, a state determining means for determining rotation state of the above-mentioned rotor is further provided, the above-mentioned activation controlling means cancels leading phase according to an output of the above-mentioned determining means and stops a predetermined cycle OFF operation of said predetermined cycle OFF means, and the above-mentioned position detecting means performs position detection in an ON period or OFF period of high-frequency switching control. With such configuration, stable PWM sensorless starting without any starting failure such as oscillation, loss of synchronism and reverse rotation becomes possible, and after cancellation of leading phase, PWM sensorless driving in the optimum phase in terms of efficiency can be performed. Moreover, since predetermined cycle OFF is not applied, starting torque can be improved, thereby shortening starting time.

A motor driving apparatus in accordance with an eighteenth aspect of the present invention may be configured so that, in the configuration from the fifteenth aspect, a state determining means for determining rotation state of the above-mentioned rotor is further provided, the above-mentioned activation controlling means cancels leading phase according to an output of the above-mentioned determining means, and the above-mentioned position detecting means performs position detection according to the above-mentioned comparison signal. With such configuration, stable PWM sensorless starting without any starting failure such as oscillation, loss of synchronism and reverse rotation becomes possible, and after cancellation of leading phase, PWM sensorless driving in the optimum phase in terms of efficiency can be performed.

A motor driving apparatus in accordance with a nineteenth aspect of the present invention may be configured so that, in the configuration from one of the sixteenth to eighteenth aspects, said state determining means determines whether or not the above-mentioned rotor rotating speed obtained on the basis of the above-mentioned position detection signal exceeds a predetermined value. With such configuration, stable PWM sensorless starting without any starting failure such as oscillation, loss of synchronism and reverse rotation becomes possible, and after cancellation of leading phase, PWM sensorless driving in the optimum phase in terms of efficiency can be performed.

A motor driving apparatus in accordance with a twentieth aspect of the present invention may be configured so that, in the configuration from one of the sixteenth to eighteenth aspects, the above-mentioned state determining means determines whether or not electrical cycle of the above-mentioned activation control signal is output a predetermined number of times or more. With such configuration, stable PWM sensorless starting without any starting failure such as oscillation, loss of synchronism and reverse rotation becomes possible, and after cancellation of leading phase, PWM sensorless driving in the optimum phase in terms of efficiency can be performed.

A motor driving apparatus in accordance with a twenty-first aspect of the present invention may be configured so that, in the configuration from one of the sixteenth to eighteenth aspects, the above-mentioned activation controlling means cancels leading phase linearly or gradually according to an output of the above-mentioned state determining means.

A motor driving apparatus in accordance with a twenty-second aspect of the present invention may be configured so that, in the configuration from one of the sixteenth to eighteenth aspects, the above-mentioned activation controlling means sets a second leading phase smaller than the leading phase of the above-mentioned activation control signal with respect to the above-mentioned position detection signal at starting, and after cancellation of leading phase according to the output of the state determining means, activation control in the second leading phase is performed.

The configuration and operation and other configuration and operation will be described in description of embodiments in detail.

According to the present invention, it becomes possible to provide an excellent motor driving apparatus which can carry out stable PWM sensorless starting without any starting failure such as oscillation, loss of synchronism and reverse rotation and shorten starting time.

While the novel features of the invention are set forth particularly in the appended claims, the invention, both as to configuration and content, will be better understood and appreciated, along with other objects and features thereof, from the following detailed description taken in conjunction with the drawings.

BRIEF DESCRIPTION OF DRAWINGS

FIG. 1 is a block diagram showing a whole configuration of a motor driving apparatus in accordance with Embodiment 1 of the present invention;

FIG. 5 is a block diagram showing a specific configuration of an activation controller in the motor driving apparatus of FIG. 1;

FIG. 22 is the block diagram showing the whole configuration of the conventional motor driving apparatus;

FIG. 24 is the block diagram showing a whole configuration of another conventional motor driving apparatus.

Figure 2:
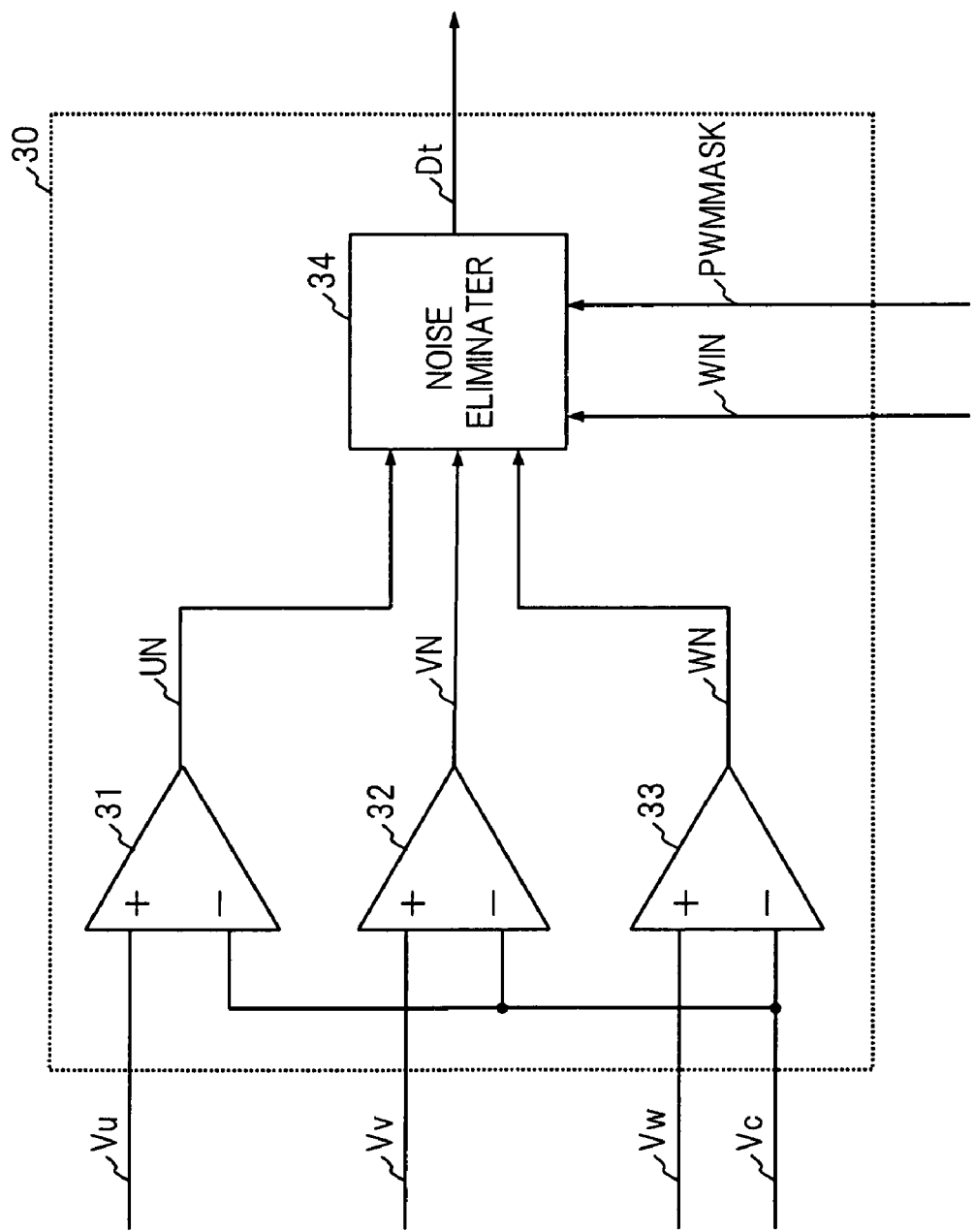
FIG. 2 is a block diagram showing a specific configuration of a position detector in the motor driving apparatus of FIG. 1.

It will be recognized that some or all of the figures are schematic representations for purposes of illustration and do not necessarily depict the actual relative sizes or locations of the elements shown.

DETAILED DESCRIPTION OF THE INVENTION

Preferred embodiments of a motor driving apparatus of the present invention will be described below with reference to the accompanying drawings.

EMBODIMENT 1

FIG. 1 is a block diagram showing a configuration of a motor driving apparatus in accordance with Embodiment 1 of the present invention. A motor 10 to be controlled by the motor driving apparatus in accordance with Embodiment 1 comprises a rotor (not shown) having a field part formed of a permanent magnet and a stator (not shown) in which three-phase windings 11, 12 and 13 are Y-connected.

As shown in FIG. 1, the motor driving apparatus has an outputting part 20, a position detector 30 as a position detecting means, an activation controller 40 as an activation controlling means, a current detector 70, a switching controller 80 as a switching controlling means and a state determining part 90 as a state determining means.

The outputting part 20 is disposed between a power supply 1 and the ground (GND) and bridge configuration is achieved by three high-side power transistors 21, 22, and 23 and three low-side power transistors 25, 26, and 27. The three-phase windings 11, 12 and 13 each are connected to connecting points of the high-side power transistors 21, 22 and 23 and the low-side power transistors 25, 26 and 27, respectively. Moreover, high-side power diodes 21d, 22d and 23d are connected in reverse parallel with the high-side power transistors 21, 22 and 23, respectively, and low-side power diodes 25d, 26d and 27d are connected reversely in parallel with the low-side power transistors 25, 26 and 27, respectively.

The outputting part 20 thus configured carries out switching control (PWM driving) of the power transistors 21, 22 and 23 and 25, 26 and 27 by using high-side activation control signals UU, VU and WU and low-side activation control signals UL, VL and WL from the activation controller 40, and supplies electric power to the three-phase windings 11, 12 and 13 of the motor 10. Although this Embodiment describes the configuration of the outputting part 20 in which the high-side power transistors 21, 22 and 23 and low-side power transistors 25, 26, and 27 are formed of N-type field effect transistors, the high-side power transistors 21, 22 and 23 may be formed of P-type field effect transistors and the low-side power transistors 25, 26 and 27 may be formed of N-type field effect transistors. Alternatively, the high-side power diodes 21d, 22d and 23d and the low-side power diodes 25d, 26d and 27d may be configured by using a parasitic diode which exists in each power transistor structurally.

Figure 3:
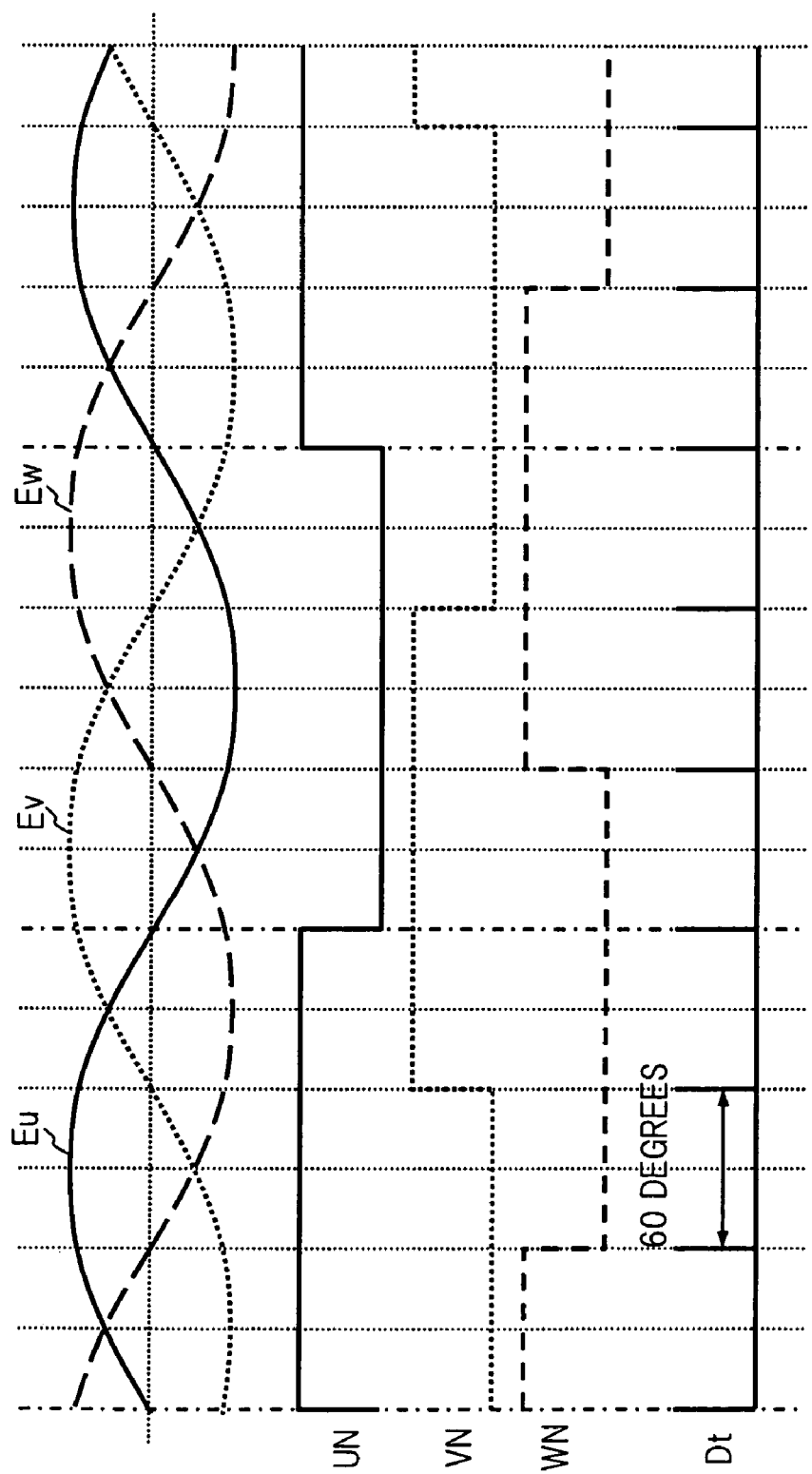
FIG. 3 is a waveform chart showing operation of the position detector in the motor driving apparatus of FIG. 1.

The position detector 30 compares three-phase terminal voltages Vu, Vv and Vw with a center tap voltage Vc of the motor 10 and detects zero-crossing of back electromotive forces which appear in a non-activation phase (open phase) of the three-phase windings. FIG. 2 is a block diagram showing a specific configuration of the position detector 30 and FIG. 3 is a timing chart showing operation of the position detector 30. In FIG. 3, waveforms Eu, Ev, and Ew show the back electromotive force of each phase.

The position detector 30 includes three comparators 31, 32 and 33 and a noise eliminater 34. The comparators 31, 32 and 33 each compare the three-phase terminal voltages Vu, Vv and Vw, respectively, with the center tap voltage Vc of the motor 10 and outputs comparison signals UN, VN and WN to the noise eliminater 34. The comparison signals UN, VN and WN are zero-crossing detection signals of the back electromotive forces Eu, Ev and Ew which appear in the non-activation phase (open phase) of the three-phase windings 11, 12 and 13. The comparison signals UN, VN and WN are influenced by kickback noise generated at switching of activation and high-frequency switching noise due to PWM driving is further superimposed thereon. However, the influence by these noises is omitted in the waveform chart of FIG. 3.

The noise eliminater 34 removes the noise superimposed on the comparison signals UN, VN and WN and outputs a position detection signal Dt. The influence by the kickback noise generated at switching of activation is subjected to mask processing by a detection window signal WIN of the activation controller 40 and the influence of the high-frequency switching noise due to PWM driving is subjected to mask processing by a PWMMASK signal of the switching controller 80.

As described above, the position detection signal Dt output following mask processing of the influence due to the noise is a pulse signal with 60 electrical degrees intervals which synchronizes with zero-crossing of the back electromotive forces appearing in the non-activation phase (open phase) of the windings. The position detection signal Dt thus generated is input to the activation controller 40 and the state determining part 90.

The configuration of position detector 30 is not limited to the configuration shown in FIG. 2, and the center tap voltage Vc may be generated in false by the three-phase terminal voltages Vu, Vv and Vw and position detection may be selectively performed by one comparator.

The activation controller 40 outputs the high-side activation control signals UU, VU and WU the low-side activation control signals UL, VL and WL for performing activation control of the power transistors 21, 22 and 23 and 25, 26 and 27 of the outputting part 20 according to the position detection signal Dt of the position detector 30. Further, the activation controller 40 adjusts activation start timing of the high-side activation control signals UU, VU and WU and the low-side activation control signals UL, VL and WL according to a state determination signal SJ sent from the state determining part 90. A PWM signal sent from the switching controller 80 is superimposed on the high-side activation control signals UU, VU and WU or the low-side activation control signals UL, VL and WL. Detailed operation of the activation controller 40 will be described later.

The current detector 70 comprises a current detecting resistor, for example, and is disposed between the outputting part 20 and the GND to detect a current flowing to the outputting part 20. The current detector 70 outputs detected current detection signal CS to the switching controller 80. Although Embodiment 1 describes the configuration in which the current detector 70 is provided between the outputting part 20 and the ground (GND), the present invention is not limited to such configuration and the current detector 70 may be provided between the power supply 1 and the outputting part 20.

The switching controller 80 outputs the PWM signal according to the current detection signal CS and a command signal EC to the activation controller 40 and causes the power transistors 21, 22 and 23 and 25, 26 and 27 of the outputting part 20 to perform high-frequency switching operation (PWM driving). Further, the switching controller 80 outputs a PWMMASK signal to the noise eliminater 34 (FIG. 2) of the position detector 30.

Figure 4:
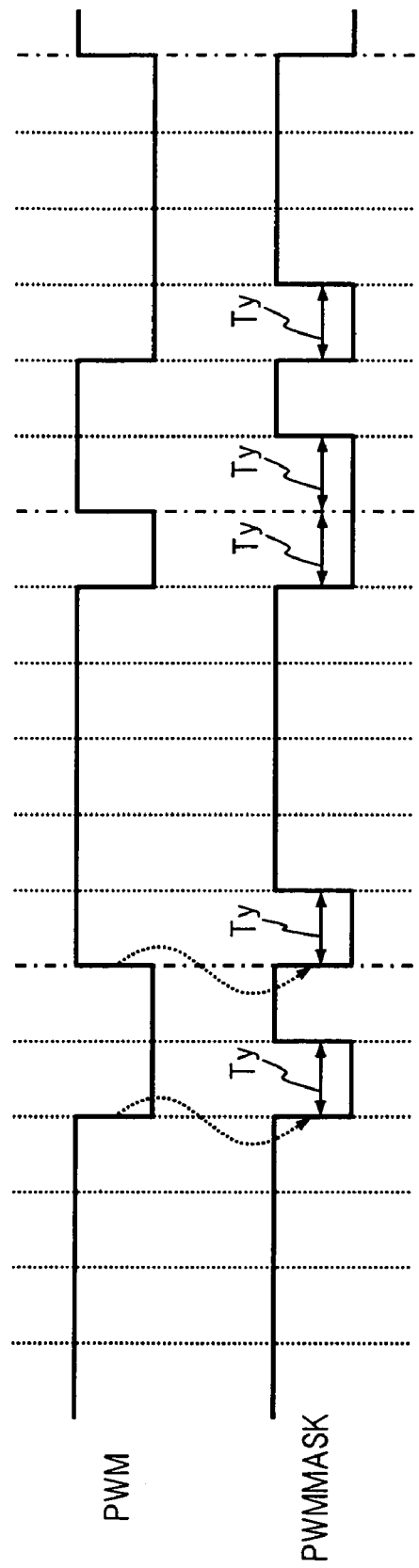
FIG. 4 is a timing chart showing operation of a switching controller in the motor driving apparatus of FIG. 1.

FIG. 4 is a waveform chart showing operation of the switching controller 80. In the switching controller 80, the PWM signal according to the command signal EC which is inputted from the outside of the apparatus and the current detection signal CS is generated. There are various methods of generating the PWM signal and since it is unnecessary to define the method specifically in the present invention, description thereof is omitted. The PWMMASK signal is generated so as to has the "L" level only for a predetermined time Ty starting from ON timing and OFF timing of the PWM signal. Thus, the influence of the high-frequency switching noise due to PWM driving is avoided by disregarding output of the comparators of the position detector 30 during the predetermined time Ty.

The state determining part 90 outputs the state determination signal SJ according to the position detection signal Dt to the activation controller 40. When the rotor rotating speed measured by the position detection signal Dt becomes a predetermined value or more, the state of the state determination signal SJ changes from the "L" level to the "H" level. The timing of change in the state of the state determination signal SJ is not limited to the above-mentioned point and may be a point when in the detection of it has been determined that the measured rotor rotating speed becomes a predetermined value or more a predetermined number of times, or a predetermined number of times in succession. Alternatively, the timing of change in the state of the state determination signal SJ may be a point when a pulse of the position detection signal Dt has been detected a predetermined number of times and can be arbitrarily set according to the circumstances.

In the motor driving apparatus in accordance with Embodiment 1 thus configured, the motor 10 is driven by PWM sensorless operation. Detailed operation of the activation controller 40 and a PWM sensorless starting method will be described below.

The activation controller 40 outputs the high-side activation control signals UU, VU and WU and the low-side activation control signals UL, VL and WL for performing activation control of the power transistors 21, 22 and 23 and 25, 26 and 27 of the outputting part 20 according to the position detection signal Dt. FIG. 5 is a block diagram showing specific configuration of the activation controller 40. The activation controller 40 is configured so as to include a synchronization signal generating circuit 41, a selecting circuit 42, a time measuring circuit 43, a first adjusting circuit 44, a second adjusting circuit 45 and an activation control signal creating circuit 46.

The synchronization signal generating circuit 41 outputs a synchronization signal Fs of a constant cycle for forcing the motor 10 to perform synchronous operation. The selecting circuit 42 outputs the position detection signal Dt or the synchronization signal Fs selectively. Immediately after the beginning of starting, the synchronization signal Fs is selected by the selecting circuit 42 and synchronous operation of the motor 10 is carried out according to the signal. When the rotor rotates with synchronous operation and the position detection signal Dt is output, the selecting circuit 42 switches the synchronization signal Fs to the position detection signal Dt and outputs it.

An output signal of the selecting circuit 42 is input to the time measuring circuit 43 and time between edges of the signal is measured in the circuit 43. A value "Data" thus measured is loaded to the first adjusting circuit 44 and the second adjusting circuit 45. The first adjusting circuit 44 outputs a first adjustment pulse F1 after a first adjustment time T1 according to the loaded measured value "Data" and the second adjusting circuit 45 outputs a second adjustment pulse F2 after a second adjustment time T2 according to the loaded measured value "Data". The activation control signal creating circuit 46 generates the high-side activation control signals UU, VU and WU and the low-side activation control signals UL, VL and WL according to the first adjustment pulse F1 and generates the detection window signal WIN for position detection according to the second adjustment pulse F2. In this manner, according to the measurement value "Data", activation start timing of the activation control signal is determined to perform sensorless driving.

The state determination signal SJ is input into the first adjusting circuit 44 and the second adjusting circuit 45, and the first adjustment time T1 and the second adjustment time T2 are adjusted according to the state determination signal SJ. That is, the first adjusting circuit 44 and the second adjusting circuit 45 adjusts activation start timing of the high-side activation control signals UU, VU and WU and the low-side activation control signals UL, VL and WL.

Figure 6:
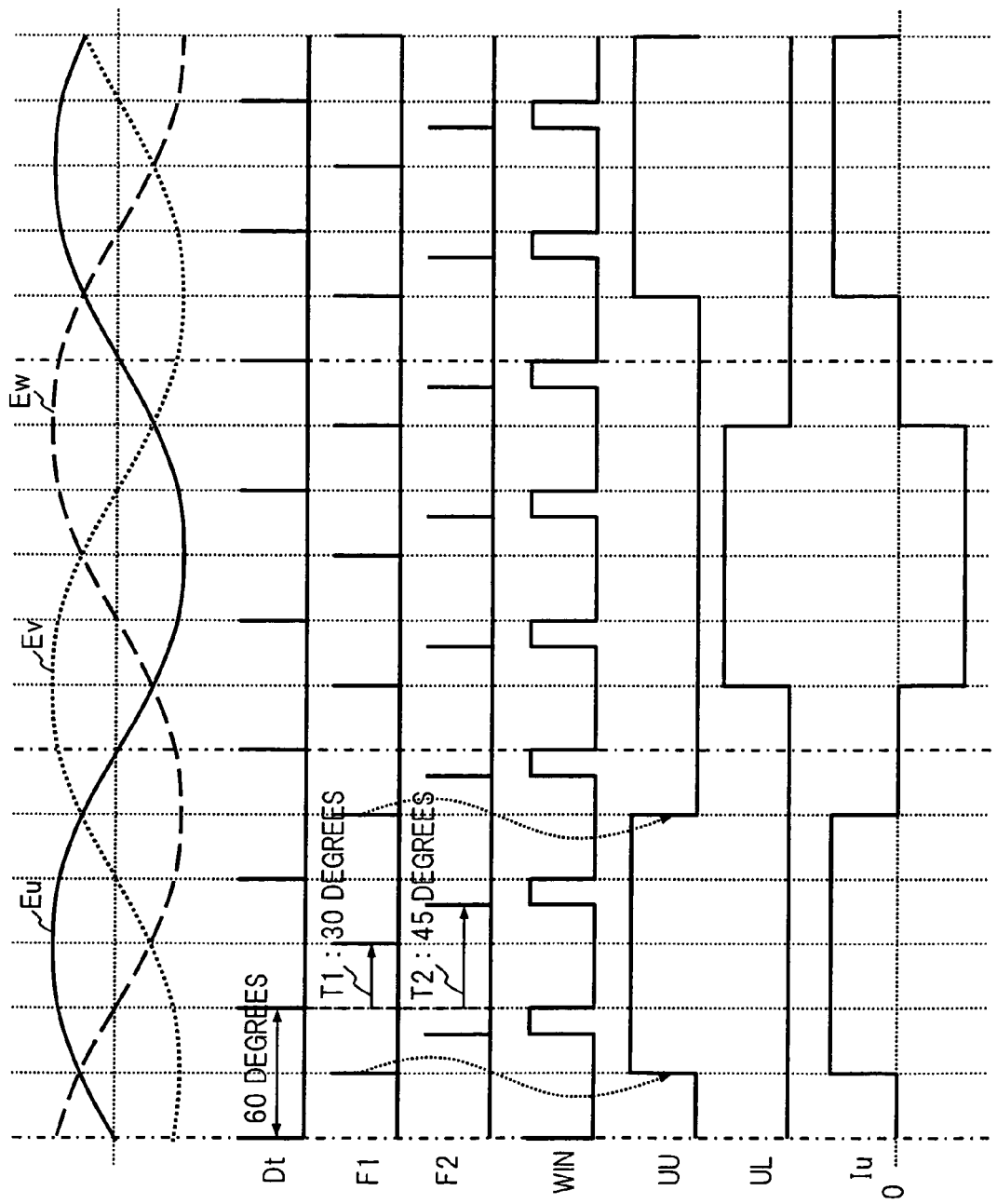
FIG. 6 is a timing chart showing operation of the activation controller in the motor driving apparatus of FIG. 1 in normal times.

FIG. 6 is a timing chart showing operation in each section of the activation controller 40. FIG. 6 is a timing chart (only U-phase) in normal times (the rotor rotating speed is a predetermined value or more). Since a V-phase and a W-phase are merely displaced from the U-phase by 120 and 240 electrical degrees, respectively, description thereof is omitted herein. The state determination signal SJ outputs the "H" level in normal times and the selecting circuit 42 of the activation controller 40 selects and outputs the position detection signal Dt.

The time measuring circuit 43 measures time between the edges of the position detection signal Dt and loads the measured value "Data" to the first adjusting circuit 44 and the second adjusting circuit 45. The loaded measured value "Data" is a time measured value corresponding to 60 electrical degrees and the first adjusting circuit 44 outputs the first adjustment pulse F1 to the activation control signal creating circuit 46 after the first adjustment time T1 as a delay time corresponding to 30 electrical degrees from the edge of the position detection signal Dt. The second adjusting circuit 45 outputs the second adjustment pulse F2 to the activation control signal creating circuit 46 after the second adjustment time T2 as a delay time corresponding to 45 electrical degrees from the edge of the position detection signal Dt. In synchronization with the second adjustment pulse F2, the state of the detection window signal WIN outputted from the activation control signal creating circuit 46 changes to the "H" level, thereby enabling position detecting operation of the position detector 30. Simultaneously with position detection (detection of zero-crossing of the back electromotive force in each phase), the state of the detection window signal WIN changes to the "L" level.

The high-side activation control signals UU, VU and WU and the low-side activation control signals UL, VL and WL are pulse signals of 120-degree activation generated from the first adjustment pulse F1. 120-degree activation means that the width of activation has an electrical angle of 120 degrees. In FIG. 6, the PWM signal of the switching controller 80 is superimposed on the high-side and low-side activation control signals UU and UL in practice. By generating the high-side activation control signals UU, VU and WU and the low-side activation control signals UL, VL and WL by the first adjustment pulse F1 and superimposing the PWM signal thereon in this manner, the motor 10 is driven by PWM sensorless operation. The output timing of the second adjustment pulse F2 is delayed by 15 electrical degrees with respect to the first adjustment pulse F1 in order to mask the influence of kickback noise generated at activation switching and the like. Although the high-side and the low-side activation control signals UU and UL are pulse signals of 120-degree activation and the output timing of the second adjustment pulse F2 is set to be equal to 45 electrical degrees from the edge of the position detection signal Dt in FIG. 6, the present invention is not limited to the activation control signal of 120-degree activation and also the output timing of the second adjustment pulse F2 corresponding to 45 electrical degrees.

Figure 7:
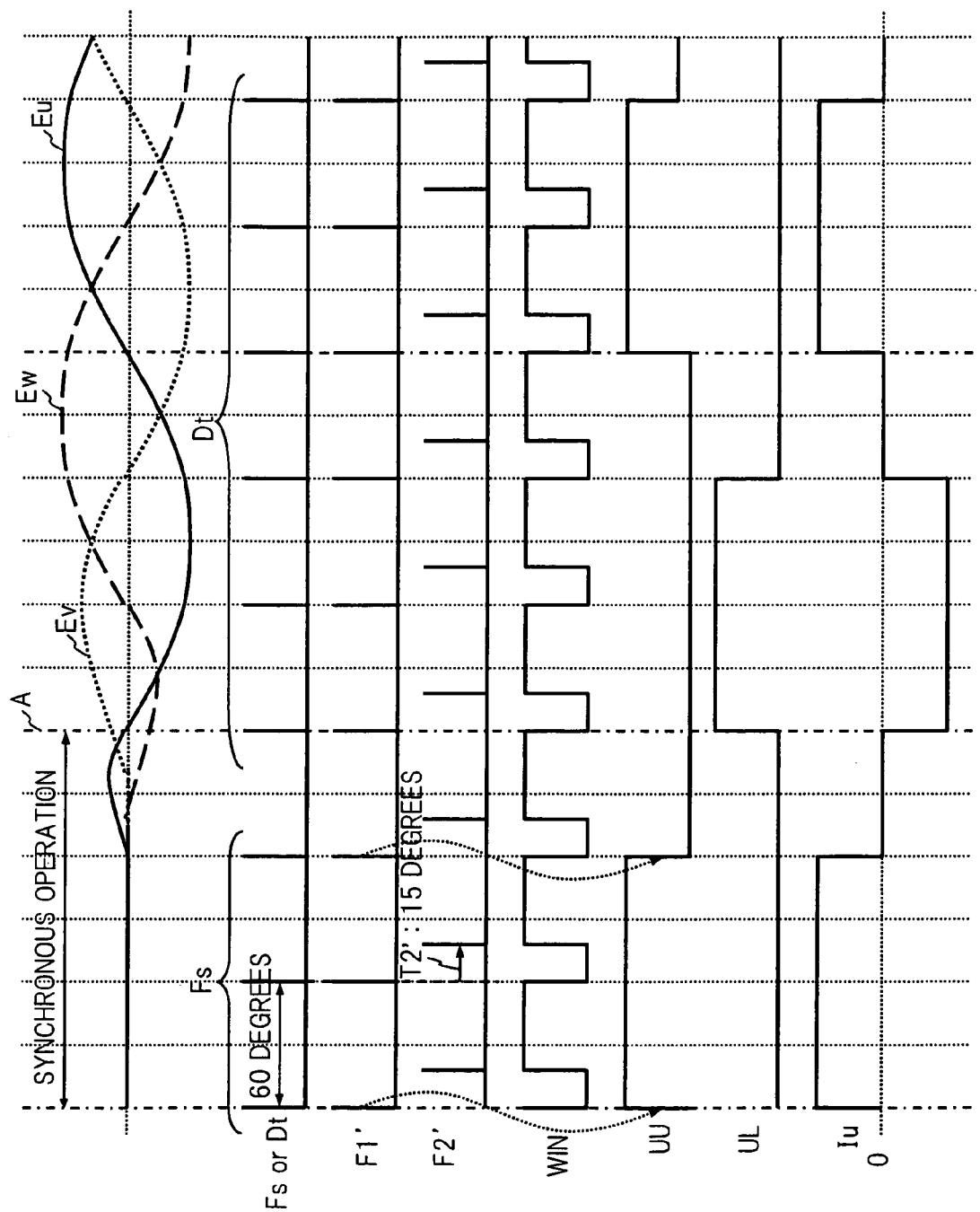
FIG. 7 is a timing chart showing operation of the activation controller in the motor driving apparatus of FIG. 1 at the time of starting.

Next, operation of the motor driving apparatus in accordance with Embodiment 1 at the time of starting will be described. FIG. 7 is a timing chart showing operation of each part (only U-phase) at the time of starting. Here, time of starting refers to a period from the beginning of starting to the time when the rotor rotating speed reaches a predetermined value. Immediately after the beginning of starting, the state determination signal SJ outputs the "L" level and the selecting circuit 42 selects and outputs the synchronization signal Fs of a constant cycle. The time measuring circuit 43 measures time between edges of the synchronization signal Fs and loads the measured value "Data" to the first adjusting circuit 44 and the second adjusting circuit 45. The loaded measured value "Data" is a measured value corresponding to 60 electrical degrees. The first adjusting circuit 44 sets the first adjustment time T1 to 0 and outputs the first adjustment pulse F1' at the same timing as the edge of the synchronization signal Fs, and the second adjusting circuit 45 outputs the second adjustment pulse F2' after the second adjustment time T2' as a delay time corresponding to 15 electrical degrees from the edge of first adjustment pulse F1'. In synchronization with the second adjustment pulse F2', the state of the detection window signal WIN changes to the "H" level, thereby enabling position detecting operation of the position detector 30, and in synchronization with the edge of the synchronization signal Fs, the state of the detection window signal WIN changes to the "L" level.

The high-side activation control signals UU, VU and WU and the low-side activation control signals UL, VL and WL are pulse signals of 120-degree activation generated from the first adjustment pulse F1'. In FIG. 7, the PWM signal of the switching controller 80 is superimposed on the high-side and low-side activation control signals UU and UL in practice. Immediately after the beginning of starting, by generating the activation control signal by the first adjustment pulse F1' generated by the synchronizing signal Fs and further superimposing the PWM signal thereon, the motor 10 is forced to perform synchronous operation.

When the position detector 30 outputs the position detection signal Dt with synchronous operation of the motor 10 (refer to a point A in FIG. 7), the selecting circuit 42 switches the synchronization signal Fs to the position detection signal Dt and outputs it. Since the state determination signal SJ remains in "L" level at this time, like the operation immediately after the beginning of starting, the first adjusting circuit 44 sets the first adjustment time T1 to 0 and outputs the first adjustment pulse F1' at the same timing as the edge of the position detection signal Dt, and the second adjusting circuit 45 outputs the second adjustment pulse F2' after the second adjustment time T2' as a delay time corresponding to 15 electrical degrees from the edge of first adjustment pulse F1'. In synchronization with the second adjustment pulse F2', the state of the detection window signal WIN changes to the "H" level, thereby enabling position detecting operation of the position detector 30 and in synchronization with the edge of the position detection signal Dt, the state of the detection window signal WIN changes to "L" level.

After the position detection signal Dt is output, by generating the activation control signal by the first adjustment pulse F1' generated by the position detection signal Dt and further superimposing the PWM signal thereon, the motor 10 is driven by PWM sensorless operation. Also from the point A onward in FIG. 7, until the rotor rotating speed reaches a predetermined value, that is, until the state of the state determination signal SJ changes from the "L" level to the "H" level, similarly, activation is started by the first adjustment pulse F1' output at the same timing as the output of the selecting circuit 42.

As described above, by advancing timing from the first adjustment pulse F1 to F1' and from the second adjustment pulse F2 to F2', in the period from the beginning of starting to the time when the rotor rotating speed reaches a predetermined value, that is, when the state determination signal SJ has the "L" level, the activation start timing of the high-side activation control signals UU, VU and WU and the low-side activation control signals UL, VL, and WL is set earlier. By advancing the activation start timing of the activation control signals in this manner, leading phase activation control corresponding to 30 electrical degrees (FIG. 7) can be performed as compared with the activation start timing of activation control in normal times (FIG. 6).

When the motor 10 is driven by PMW sensorless operation by thus performing leading phase activation control, the rotor rotating speed is accelerated and then becomes a predetermined value. At this point, the state of the state determination signal SJ changes from the "L" level to the "H" level. When the state determination signal SJ changes to "H" level, switching to activation control in the efficient and optimal phase shown in FIG. 6 is made to perform PWM sensorless driving.

In the motor driving apparatus in accordance with Embodiment 1, since leading phase activation control is performed in the period from the beginning of starting to the time when the rotor rotating speed reaches the predetermined value, and when the rotor rotating speed becomes the predetermined value or more, switching to activation control in the optimal phase is made to perform PWM sensorless driving, starting time can be shortened. The position detection signal Dt in the position detector 30 becomes a detection signal which is always delayed in phase with respect to the real phase which should be detected originally in the region where the rotating speed is slow, for example, early stages of starting. To perform leading phase activation control in the period from the beginning of starting to the time when the rotor rotating speed reaches the predetermined value is almost equivalent to perform activation control in the phase close to the optimal phase which should be activated originally. That is, by making the activation control signal generated according to the position detection signal Dt delayed in phase a leading phase activation control signal, delay in phase is corrected to perform activation control. Hence, as compared with the conventional method of getting started by the activation control signal generated according to the position detection signal Dt delayed in phase, since starting by the activation control signal in the phase close to the optimal phase is performed by applying leading phase activation control in the motor driving apparatus in accordance with Embodiment 1, starting torque is improved and starting time can be shortened.

Although Embodiment 1 describes 120-degree activation as an example, wide angle activation like 150-degree activation may be used in the present invention. 150-degree activation means that the width of activation has an electrical angle of 150 degrees. Although Embodiment 1 describes the amount of phase advance as 30 electrical degrees, it goes without saying that 20 or 10 electrical degrees can achieve the effect of shortening starting time similarly. Although the position detection signal Dt is defined as a pulse signal generated in every 60 electrical degrees, the present invention is not necessarily limited to this, and activation control may be performed by using a pulse signal generated in every 120 electrical degrees or 360 electrical degrees. Although the state of the state determination signal SJ is changed using the predetermined rotor rotating speed as a threshold, the state of the state determination signal SJ may be changed in substantially proportional to the rotor rotating speed and accordingly the amount of leading phase may be cancelled substantially proportionately or gradually. Embodiment 1 describes the driving method of efficiently setting the activation start timing of the activation control signal in an optimal phase in normal times when the state determination signal SJ has the "H" level. However, the present invention is not limited to this method and it may be set so as to rotate at higher speed by leading phase and the setting method can be set arbitrarily according to circumstances.

EMBODIMENT 2

Figure 8:
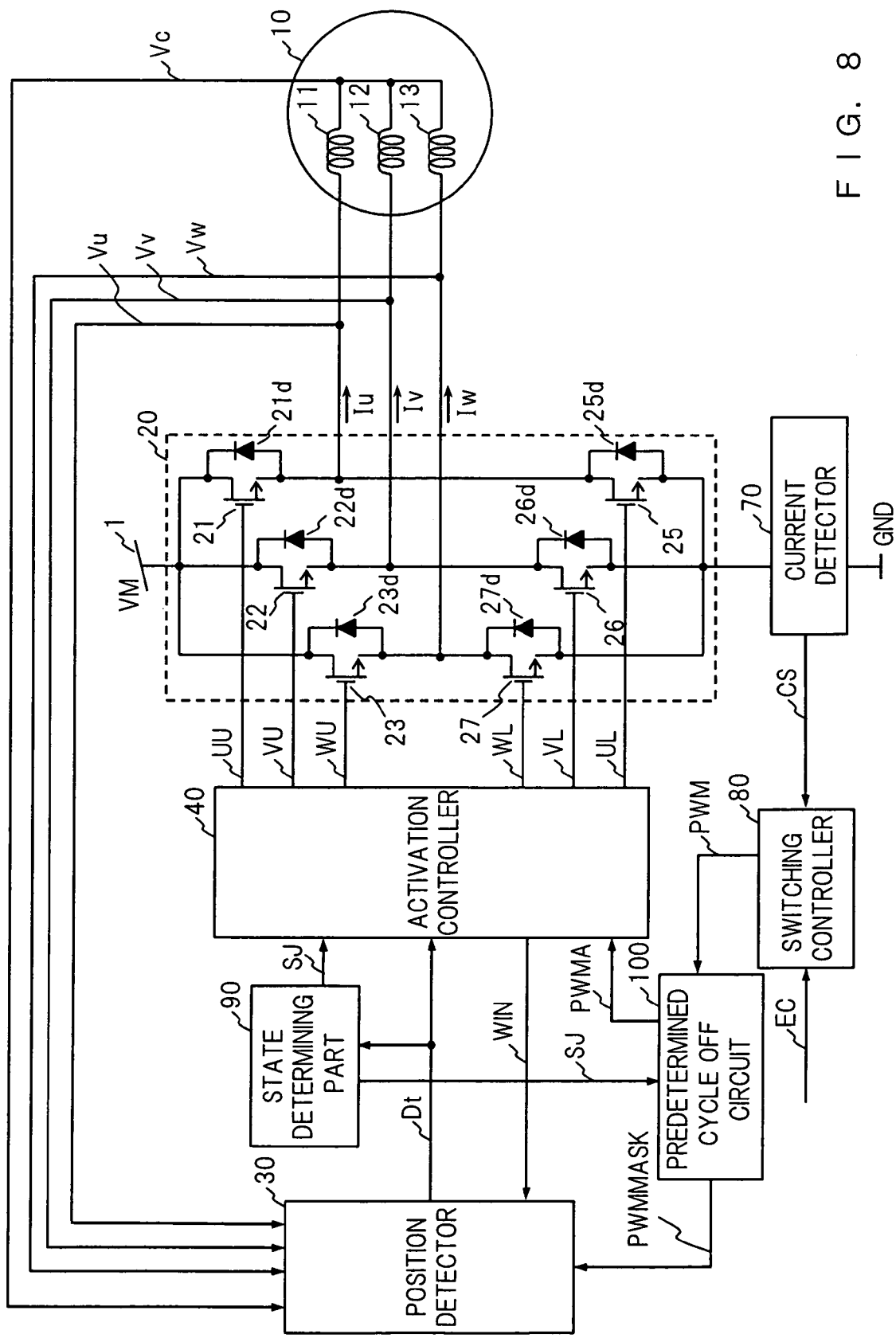
FIG. 8 is a block diagram showing a whole configuration of a motor driving apparatus in accordance with Embodiment 2 of the present invention.

Next, a motor driving apparatus in accordance with Embodiment 2 of the present invention will be described below. FIG. 8 is a block diagram showing a configuration of the motor driving apparatus in accordance with Embodiment 2 of the present invention. The motor driving apparatus in accordance with Embodiment 2 is different from the motor driving apparatus in accordance with Embodiment 1 in that a predetermined cycle OFF circuit 100 is provided. As shown in FIG. 8, the predetermined cycle OFF circuit 100 is configured so as to receive inputs of the PWM signal from the switching controller 80 and the state determination signal SJ from the state determining part 90, output a PWMA signal to the activation controller 40 and outputs a PWMMASK signal to the position detector 30. Since the other configuration and operation are the same as those in accordance with Embodiment 1, description thereof is omitted in Embodiment 2.

Figure 9:
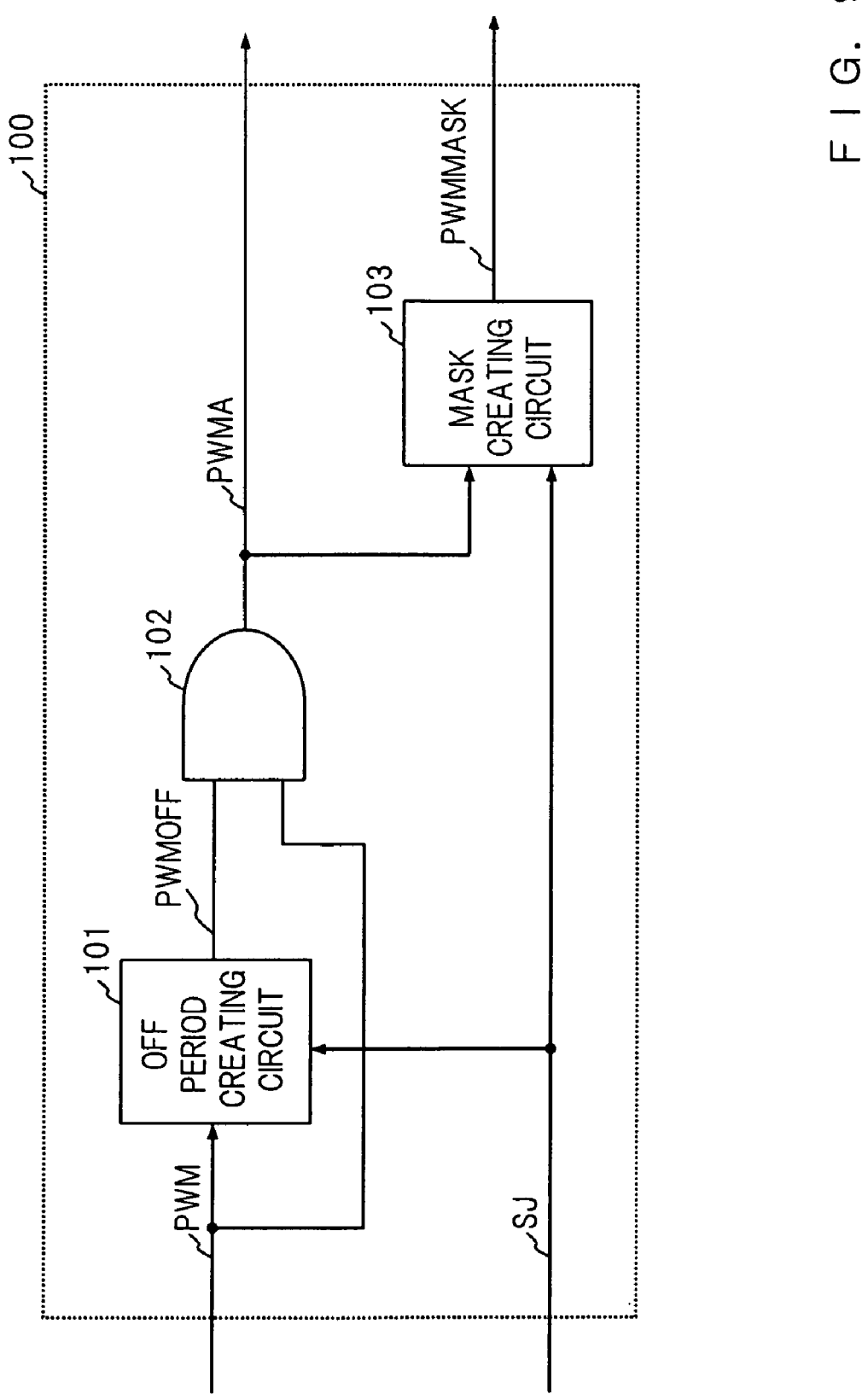
FIG. 9 is a block diagram showing a specific configuration of a predetermined cycle OFF circuit in the motor driving apparatus of FIG. 8.

FIG. 9 is a block diagram showing a specific configuration of the predetermined cycle OFF circuit 100. The predetermined cycle OFF circuit 100 is configured so as to include an OFF period creating circuit 101, an AND gate 102, and a mask creating circuit 103. The OFF period creating circuit 101 receives input of the PWM signal of the switching controller 80 and outputs a PWMOFF signal according to the state determination signal SJ. The AND gate 102 performs AND operation of the PWM signal and the PWMOFF signal and outputs the PWMA signal. The mask creating circuit 103 receives input of the PWMA signal and outputs the PWMMASK signal according to the state determination signal SJ.

Figure 10:
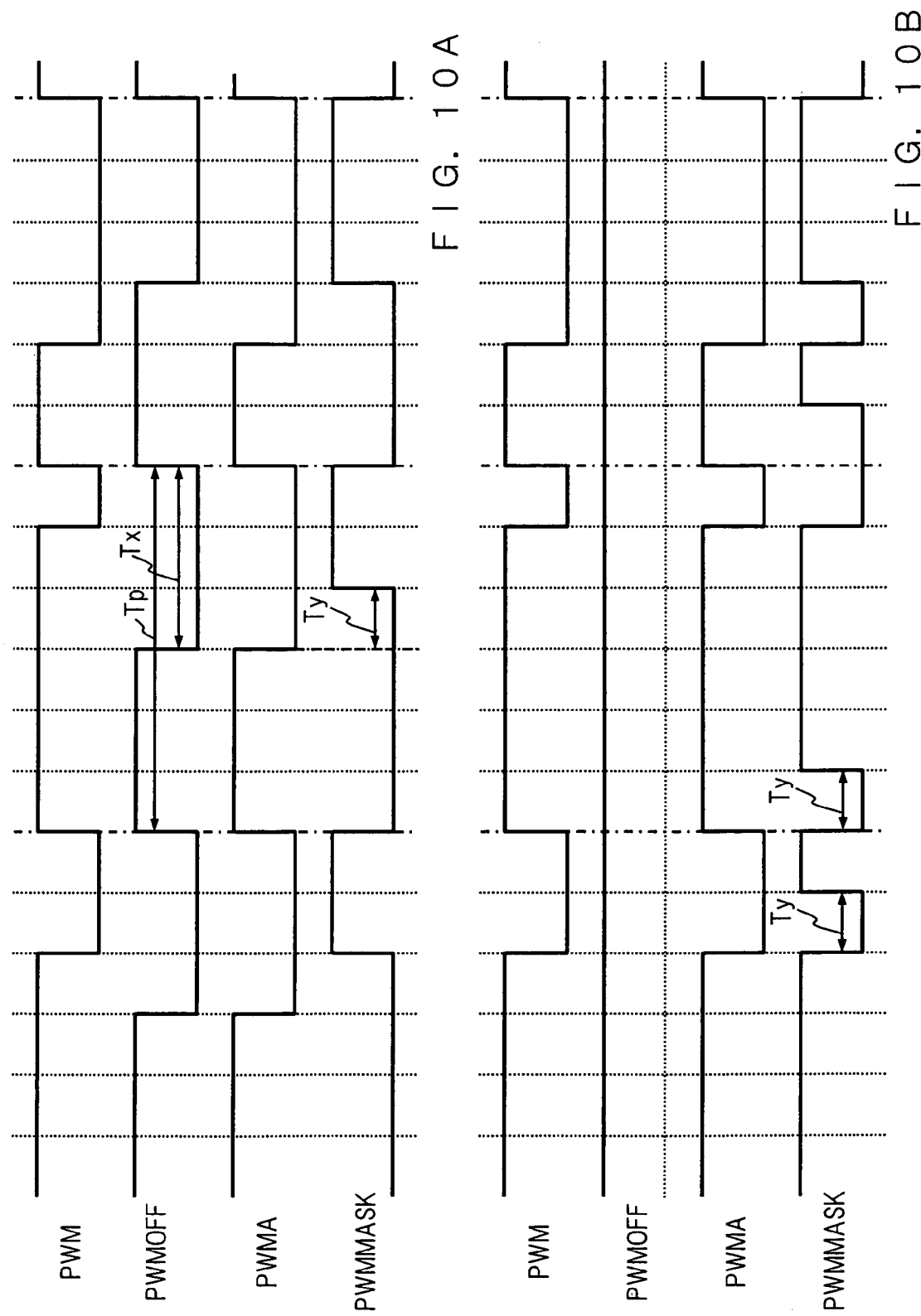
FIG. 10A and FIG. 10B are timing charts showing operation of the predetermined cycle OFF circuit in the motor driving apparatus of FIG. 8.

FIGS. 10A and 10B are timing charts showing operation of each section of the predetermined cycle OFF circuit 100. FIG. 10A is a timing chart in the case where the state determination signal SJ has the "L" level (the period from the beginning of starting to the time when the rotor rotating speed reaches the predetermined value) and FIG. 10B is a timing chart in the case where the state determination signal SJ has the "H" level (when the rotor rotating speed is the predetermined value or more). In FIG. 10A, the OFF period creating circuit 101 outputs the PWMOFF signal which synchronizes with a rising edge of the PWM signal and turns OFF during a Tx period in a predetermined cycle Tp. Therefore, a PWMA signal is a signal which turns OFF when at least one of the PWM signal and the PWMOFF signal is in the OFF period. Although the ON duty of the PWMA signal is smaller than the ON duty which should be activated originally as compared to the PWM signal, no abnormalities in activation arise in real operation.

The mask creating circuit 103 generates a PWMMASK signal which has the "L" level in the ON period of the PWMA signal and a predetermined time Ty starting from the OFF timing of the PWMA signal. The PWMA signal is input to the activation controller 40 and drives the motor 10 by PWM operation having the OFF period on a predetermined cycle. The PWMMASK signal is also input to the noise eliminater 34 of the position detector 30, thereby enabling rotor position detecting operation in the period obtained by eliminating the ON period of the PWM driving (PWMA signal) and the predetermined time Ty starting from the OFF timing of PWM driving (PWMA signal). That is, rotor position is detected only in the OFF period of the PWM driving (OFF period detection). The OFF timing of in the predetermined cycle Tp is not limited to the point shown in FIG. 10A, and any setting value which meets the requirement that an OFF period Tx is larger than a mask time Ty of the PWMMASK signal can be set.

Next, in FIG. 10B, the OFF period creating circuit 101 outputs the PWMOFF signal of the "H" level at all times. Therefore, the PMWA signal turns into the PWM signal as it is. The mask creating circuit 103 generates the PWMMASK signal which has the "L" level only for the predetermined time Ty starting from the ON timing and OFF timing of the PWMA signal. The PWMA signal is input to the activation controller 40 to performs PWM driving of the motor 10. The PWMMASK signal is also input to the noise eliminater 34 of the position detector 30, thereby enabling rotor position detecting operation in the period obtained by eliminating the predetermined time Ty starting from the ON timing and OFF timing of PWM driving (PWMA signal). That is, both ON period detection and OFF period detection of PWM driving are performed.

In the motor driving apparatus in accordance with Embodiment 2 thus configured, in the period from the beginning of starting to the time when the rotor rotating speed reaches the predetermined value, only OFF period detection of PWM driving is performed in the position detector 30 and leading phase activation control is performed in the activation controller 40. When the rotor rotating speed is the predetermined value or more, the position detector 30 performs both of the ON period detection and the OFF period detection and the activation controller 40 performs activation control in the optimal phase. The motor driving apparatus in accordance with Embodiment 2 thus configured can shorten starting time and carry out stable PWM sensorless driving without start failure such as oscillation, loss of synchronism and reverse rotation.

In the region where the rotating speed is low, for example, in early stages of starting, the back electromotive forces appearing in the non-activation phase (open phase) of the windings are low. Therefore, according to the conventional sensorless driving method of performing position detection by comparing the terminal voltages with the center tap voltage, false detection is often caused, thereby generating the position detection signal Dt shifted in phase with respect to the real phase which should be detected originally. Moreover, in the case of PMW sensorless driving, induced voltage peculiar to PWM driving is superimposed on the back electromotive force. Therefore, especially in the region where the rotating speed is slow, for example, in early stages of starting, since the induced voltage peculiar to PWM driving is dominant over the back electromotive force, false detection is likely to occur. According to the conventional sensorless driving method, since the activation control signal is generated on the basis of the position detection signal Dt including the false detection, there is a high possibility that a starting failure such as oscillation, loss of synchronism and reverse rotation may occur. On the other hand, when the rotor rotating speed is high as in normal times, the back electromotive forces appearing in the three-phase windings are high and become dominant over the induced voltage characteristic to PWM driving. Accordingly, influence due to the induced voltage peculiar to PWM driving becomes smaller as the rotating speed is increased and the position detection signal Dt can actually detect the real phase which should be detected originally.

The characteristic of the induced voltage peculiar to PWM becomes opposite in polarity whether the ON period detection or the OFF period detection is performed. Especially when the rotor position is detected only in the OFF period, stable PWM sensorless starting can be carried out. This is due to that the characteristic of the induced voltage peculiar to PWM driving especially in the OFF period detection is certainly detected in the lagging phase with respect to the real phase to be detected originally and improper acceleration activation control due to false detection is eliminated.

As described above, providing that, in the period from the beginning of starting to the time when the rotor rotating speed reaches a predetermined value, PWM driving having the OFF period on a predetermined cycle is performed, and only the OFF period detection of PWM driving is performed, stable PWM sensorless starting without failure in starting can be achieved. However, although stable PWM sensorless starting is possible, starting torque is not enough, since position detection is certainly performed in the lagging phase with respect to the real phase to be detected originally and activation control is performed according to the detected position detection signal Dt delayed in phase Thus, by applying leading phase activation control, that is, making the activation control signal generated according to the position detection signal Dt delayed in phase the leading phase activation control signal, activation control in which delay in phase is corrected can be achieved. Therefore, as compared with the conventional method of getting started by using the activation control signal generated according to position detection signal Dt in the lagging phase, with the configuration of the motor driving apparatus in accordance with Embodiment 2, since leading phase activation control is applied and starting by the activation control signal in the phase close to the optimal phase is performed, starting torque is improved, leading to reduction in starting time.

Figure 11:
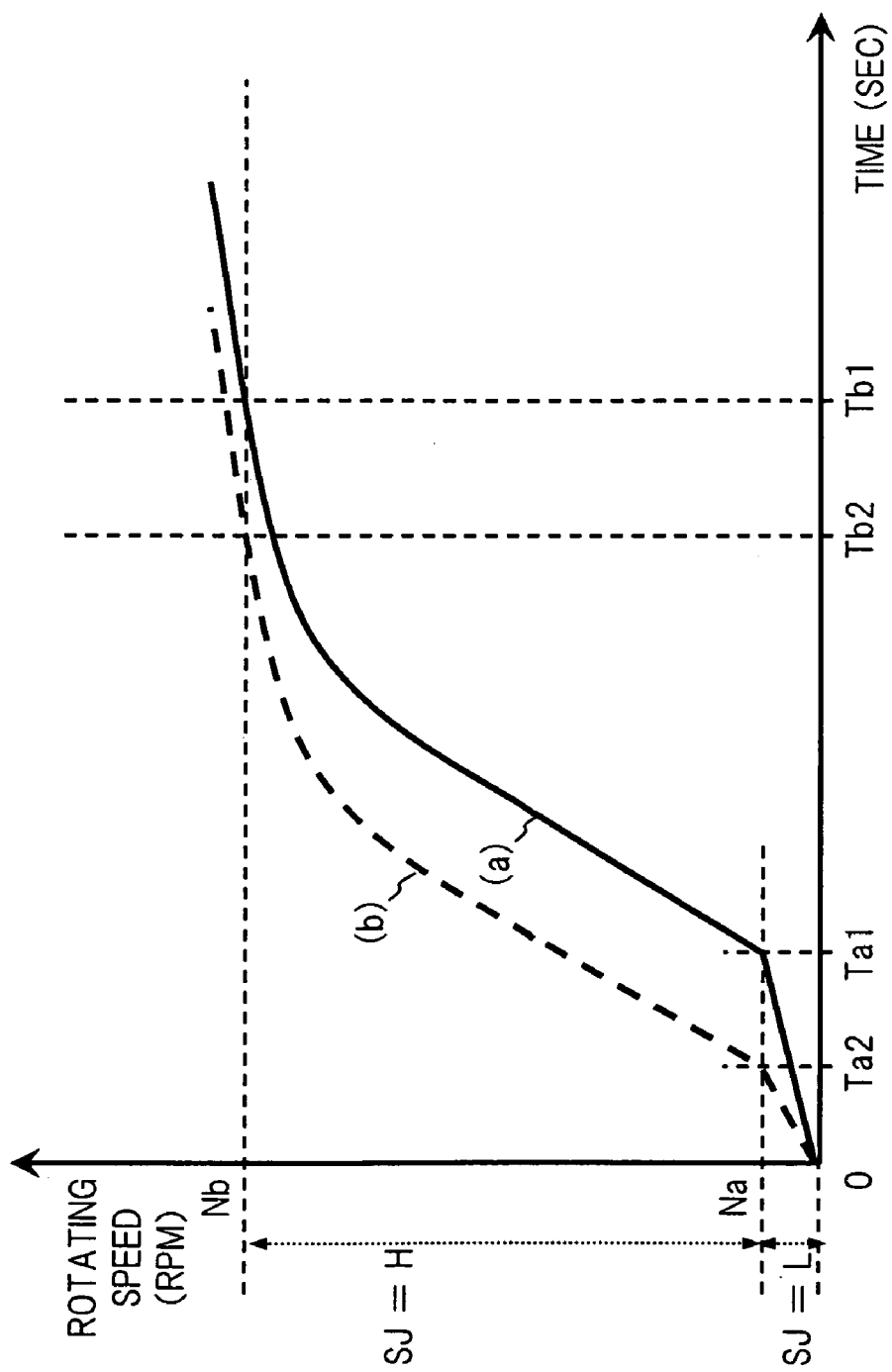
FIG. 11 is a starting characteristic diagram in the motor driving apparatus in accordance with Embodiment 2.

FIG. 11 is a view showing starting characteristics, a starting curve (a) represented by a solid line shows a starting characteristic in the case where leading phase activation control is not applied and a starting curve (b) represented by a dashed line shows a starting characteristic in the case where leading phase activation control is applied to starting. In FIG. 11, a horizontal axis represents starting time [sec] and a vertical axis represents rotor rotating speed [rpm]. A value Na in the vertical axis of FIG. 11 is a threshold of the rotor rotating speed which changes the state of the state determination signal SJ. In the starting curve (b) of FIG. 11, in the region where the rotor rotating speed is lower than the predetermined rotating speed Na, that is, the state determination signal has the "L" level, leading phase activation control is performed and in the region where the rotor rotating speed is the predetermined rotating speed Na or more, that is, the state determination signal SJ has the "H" level, activation control in the optimum phase is performed. As shown by the starting curve (b) of FIG. 11, by applying leading phase activation control, starting torque can be improved, thereby enabling increase in the gradient of speed change to time. As a result, the starting time up to the predetermined rotating speed Na can be shortened from Ta1 to Ta2 and the starting time up to a rotating speed Nb can also be shortened from Tb1 to Tb2.

As described above, in the motor driving apparatus in accordance with Embodiment 2, by performing PWM driving having the OFF period on a predetermined cycle and carrying out only OFF period detection of PWM driving in the period from the beginning of starting to the time when the rotor rotating speed reaches a predetermined value, stable PWM sensorless driving without any start failure such as oscillation, loss of synchronism and reverse rotation can be achieved, and by applying leading phase activation control, starting time can be shortened.

EMBODIMENT 3

Figure 12:
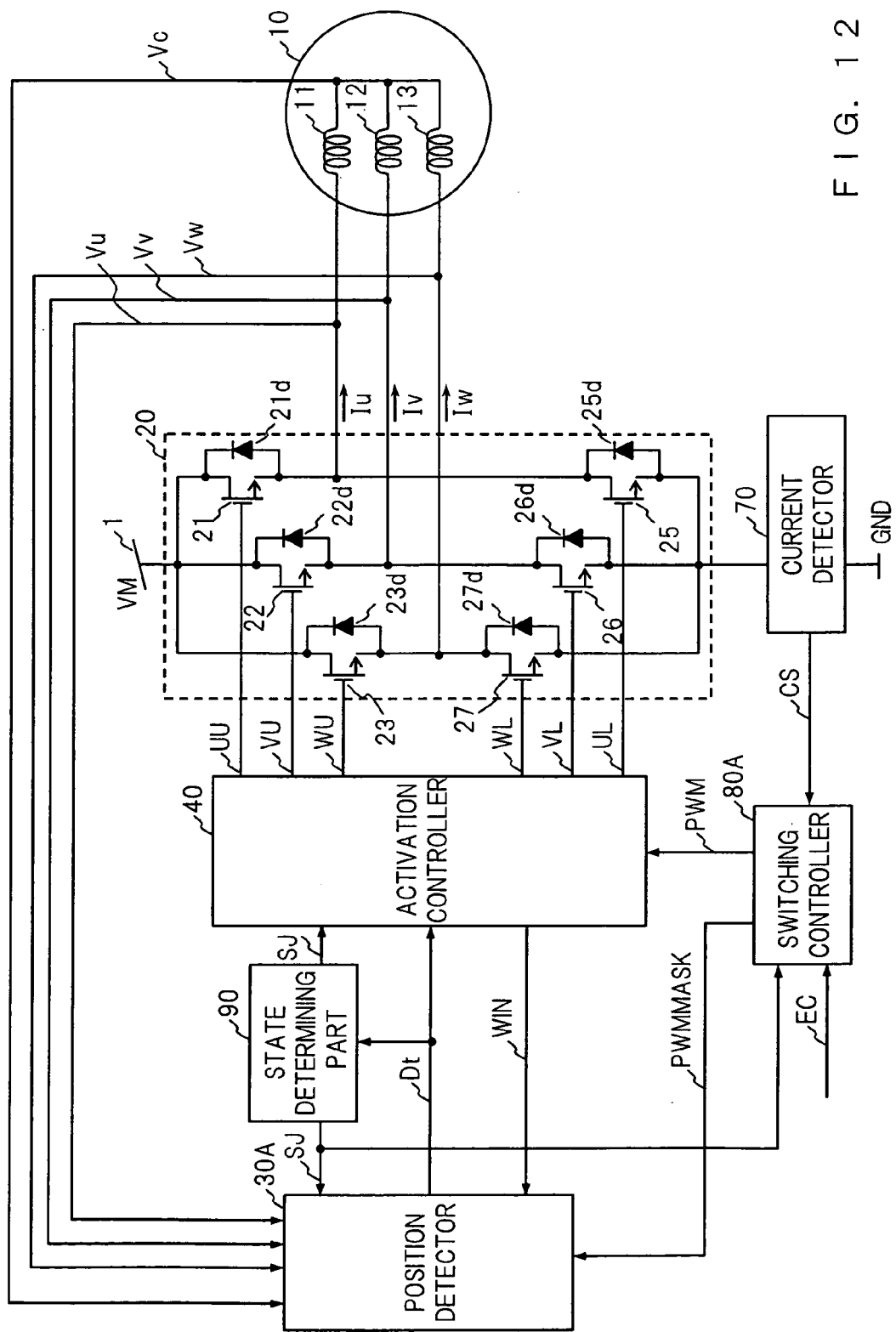
FIG. 12 is a block diagram showing a whole configuration of a motor driving apparatus in accordance with Embodiment 3 of the present invention.

FIG. 12 is a block diagram showing a configuration of a motor driving apparatus in accordance with Embodiment 3 of the present invention. The motor driving apparatus in accordance with Embodiment 3 is different from the above-mentioned Embodiment 1 in the configuration of a position detector 30A and a switching controller 80A. Other configuration and operation are the same as those described in accordance with Embodiment 1.

Figure 13:
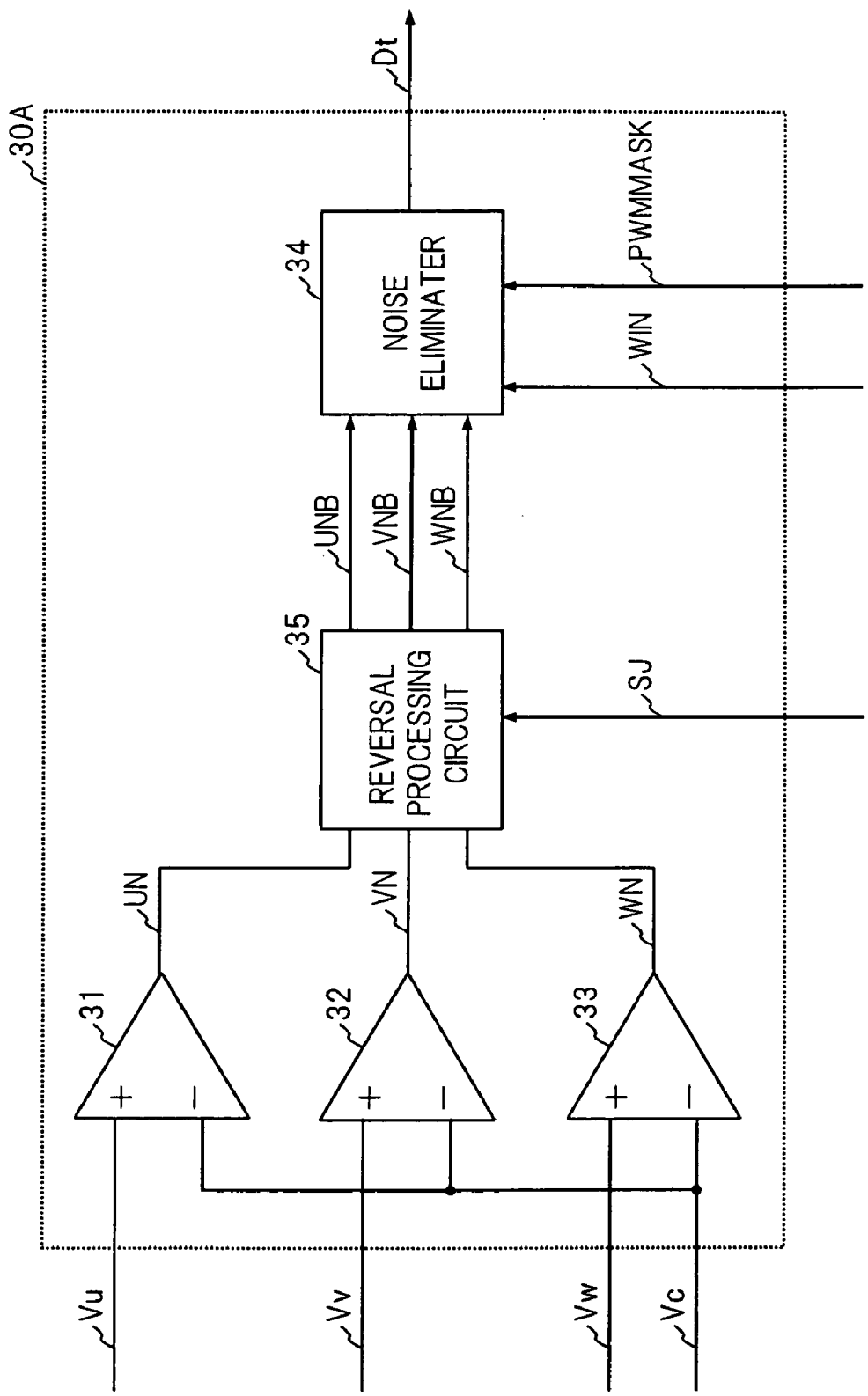
FIG. 13 is a block-diagram showing a specific configuration of a position detector in the motor driving apparatus of FIG. 12.

FIG. 13 is a block diagram showing a specific configuration of the position detector 30A in accordance with Embodiment 3. In the position detector 30A, a reversal processing circuit 35 is added to the position detector 30 of Embodiment 1. The position detector 30A compares the three-phase terminal voltages Vu, Vv and Vw with the center tap voltage Vc of the motor 10 and detects zero-crossing of the back electromotive forces which appear in a non-activation phase (open phase) of the windings according to reversal processing output of the comparison result.

The position detector 30A includes the three comparators 31, 32 and 33, the noise eliminater 34 and the reversal processing circuit 35. The comparators 31, 32 and 33 each compare the three-phase terminal voltages Vu, Vv and Vw, respectively, with the center tap voltage Vc of the motor 10 and output the comparison signals UN, VN and WN on which influence by kickback noise generated at switching of activation and high-frequency switching noise due to PWM driving are superimposed. The reversal processing circuit 35 performs reversal processing of the comparison signals UN, VN and WN and outputs reversal comparison signals UNB, VNB and WNB. The noise eliminater 34 removes the noise superimposed the reversal comparison signals UNB, VNB and WNB and outputs the position detection signal Dt according to the signals from which the noise is removed. In the noise eliminater 34, the influence by the kickback noise generated at switching of activation is removed through mask processing by use of the detection window signal WIN of the activation controller 40, and the influence of the high-frequency switching noise due to PWM driving is removed through mask processing by use of the PWM-MASK signal of the switching controller 80A.

The switching controller 80A outputs the PWM signal according to the current detection signal CS and the command signal EC to the activation controller 40 and causes each power transistor of the outputting part 20 to perform high-frequency switching operation (PWM driving). The switching controller 80A is configured so as to receive input of the state determination signal SJ from the state determining part 90 and outputs the PWMMASK signal according to the state determination signal SJ to the noise eliminater 34 of the position detector 30.

Figure 14A:
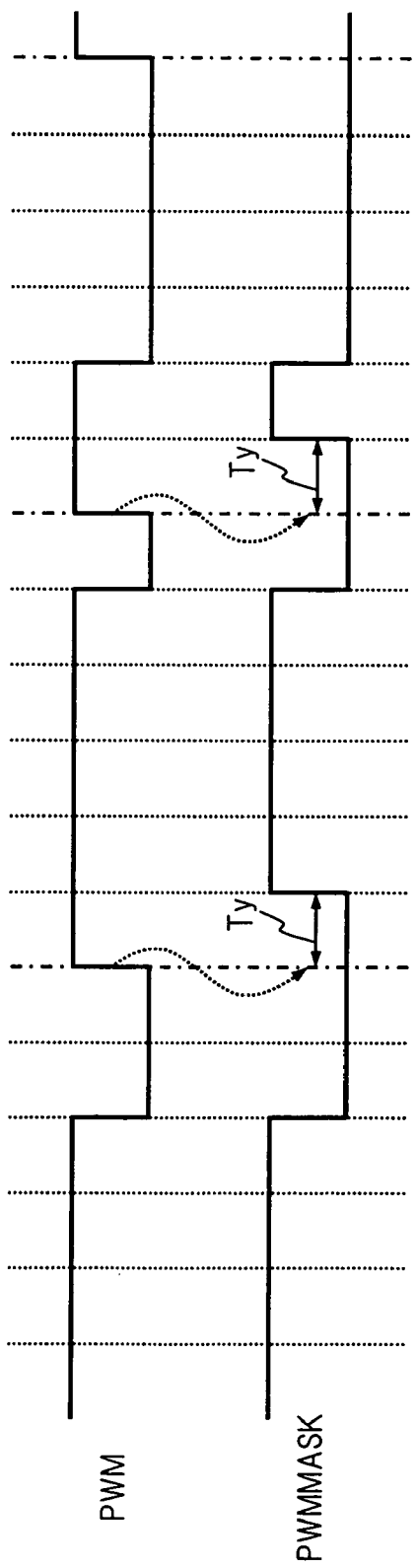
FIG. 14A and FIG. 14B are timing charts showing operation of a switching controller of FIG. 12.
Figure 14B:
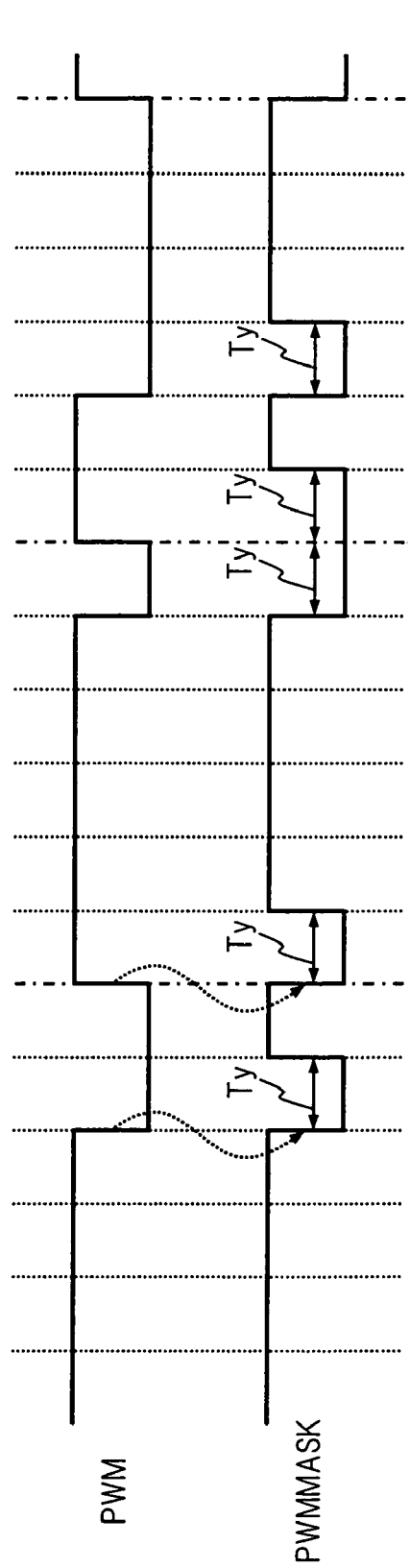

FIGS. 14A and 14B are wave form charts showing operation of switching controller 80A. In FIG. 14A shows the case where the state determination signal SJ has the "L" level (the period from the beginning of starting to the time when the rotor rotating speed reaches the predetermined value) and FIG. 14B shows the case where the determination signal SJ has the "H" level (when the rotor rotating speed is the predetermined value or more). In the switching controller 80A, the PWM signal is generated according to the current detecting signal CS and the command signal EC. However, since there are various methods of generating the PWM signal and it is unnecessary to define the method specifically herein, description thereof is omitted. In FIG. 14B, as in Embodiment 1, the PWMMASK signal is generated so as to have the "L" level in the predetermined time Ty starting from the ON timing and the OFF timing of the PWM signal. In FIG. 14A, the PWMMASK signal is generated so as to have the "L" level in the OFF period of the PWM signal and a predetermined time Ty starting from the ON timing of the PWM signal.

Although the noise eliminater 34 of the position detector 30A to which the PWMMASK signal is input performs noise removal and rotor position detection according to the PWMMASK signal, since the PWMMASK signal is switched according to the state determination signal SJ, a detecting method is also changed according to the state determination signal SJ. In the state shown in FIG. 14A, that is, in the period during which the state determination signal SJ has the "L" level (the period from the beginning of starting to the time when the rotor rotating speed reaches the predetermined value), rotor position detecting operation is enabled in the period obtained by eliminating the OFF period and the predetermined time Ty starting from the ON timing of PWM driving. In other words, in the period from the beginning of starting to the time when the rotor rotating speed reaches the predetermined value, only ON period detection of PWM driving is performed.

On the other hand, when the determination signal SJ has the "H" level (the rotor rotating speed is the predetermined value or more), rotor position detecting operation is enabled in the period obtained by eliminating the predetermined time Ty starting from each of the ON timing and the OFF timing of PWM driving. In other words, when the rotor rotating speed is the predetermined value or more, both of the ON period detection and the OFF period detection of PWM driving are performed.

In the motor driving apparatus in accordance with Embodiment 3 thus configured, when the state determination signal SJ has the "H" level (rotor rotating speed is the predetermined value or more), normal PWM sensorless driving is carried out as in the above-mentioned Embodiments 1 and 2. On the other hand, when the state determination signal SJ has the "L" level (in the period from the beginning of starting to the time when the rotor rotating speed reaches the predetermined value), ON period detection is performed using the reversal comparison signals UNB, VNB and WNB obtained by reversing the comparison signals UN, VN and WN. This operation is quasi-equivalent to performing only OFF period detection described in Embodiment 2. This is based on the fact that the characteristic of the induced voltage peculiar to PWM becomes opposite in polarity whether the ON period detection or the OFF period detection is performed, and rotor position is detected by using the reversal comparison signals in place of performing only ON period detection. Thus, the motor driving apparatus in accordance with Embodiment 3 can obtain the same effect as the motor driving apparatus in accordance with Embodiment 2 in which only OFF period detection is performed by using the comparison signals to detect rotor position. That is, stable PWM sensorless driving without start failure such as oscillation, loss of synchronism and reverse rotation can be achieved and since leading phase activation control is applied, starting time can be shortened.

Further, contrary to Embodiment 2, in Embodiment 3, since the motor driving apparatus does not require OFF period to be provided on a predetermined cycle, decrease in current in the OFF period of the predetermined cycle, that is, decrease in starting torque is improved, thereby further shortening starting time.

The configuration of position detector 30A is not limited to the configuration shown in FIG. 13, and the center tap voltage Vc may be generated in false by the three-phase terminal voltages Vu, Vv and Vw and position detection may be selectively performed by one comparator.

In Embodiment 3, noise eliminating of the comparison signals is performed by using the signal obtained by reversing the comparison signals. However, even when noise eliminating of the comparison signals is firstly performed, the comparison signals subjected to noise eliminating are reversed and output, and then rotor position is detected by using the reversed comparison signal, the same effect can be obtained.

EMBODIMENT 4

Figure 15:
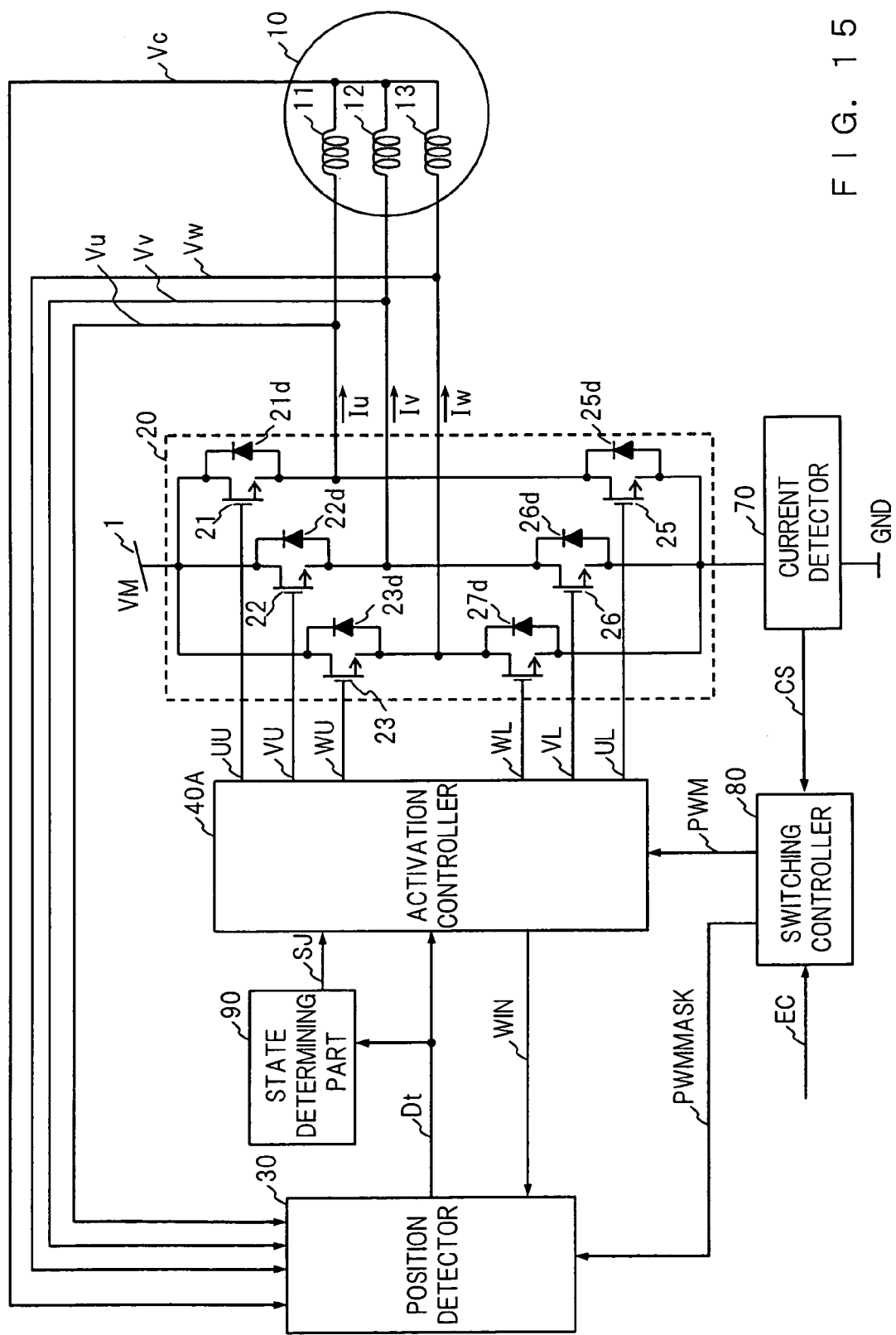
FIG. 15 is a block diagram showing a whole configuration of a motor driving apparatus in accordance with Embodiment 4 of the present invention.

FIG. 15 is a block diagram showing a configuration of a motor driving apparatus in accordance with Embodiment 4 of the present invention. The motor driving apparatus in accordance with Embodiment 4 is different from the above-mentioned Embodiment 1 in the configuration of an activation controller 40A and other configuration and operation are the same as those described in accordance with Embodiment 1.

Figure 16:
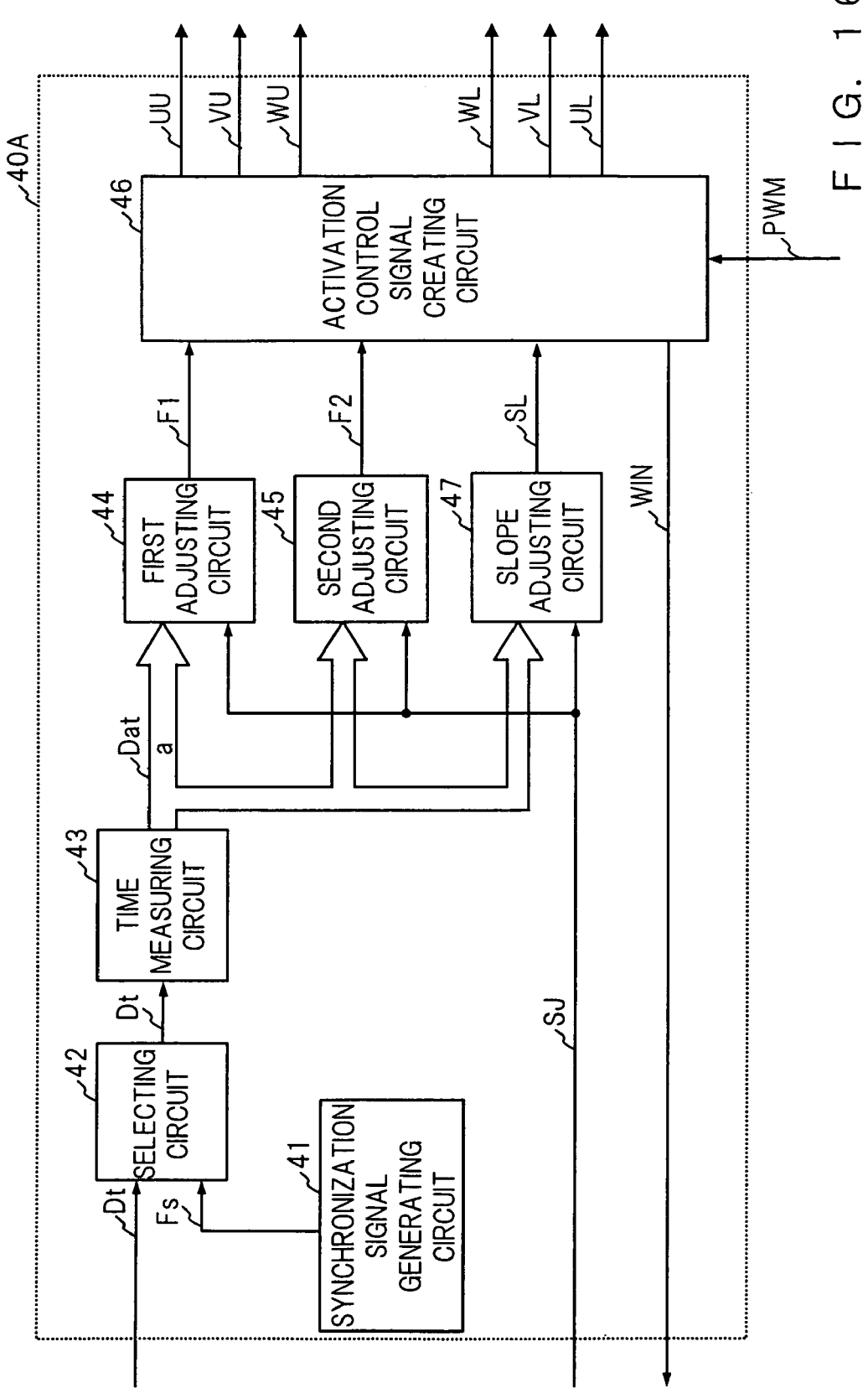
FIG. 16 is a block diagram showing a specific configuration of an activation controller in the motor driving apparatus of FIG. 15.

FIG. 16 is a block diagram showing a specific configuration of the activation controller 40A in accordance with Embodiment 4. The activation controller 40A has the configuration in which a slope adjusting circuit 47 is added to the activation controller 40 of Embodiment 1. The slope adjusting circuit 47 outputs a slope adjustment pulse SL on the basis of the measured value "Data" of the time measuring circuit 43. The slope adjusting circuit 47 also adjusts output timing of the slope adjustment pulse SL according to the state determination signal SJ.

Figure 17:
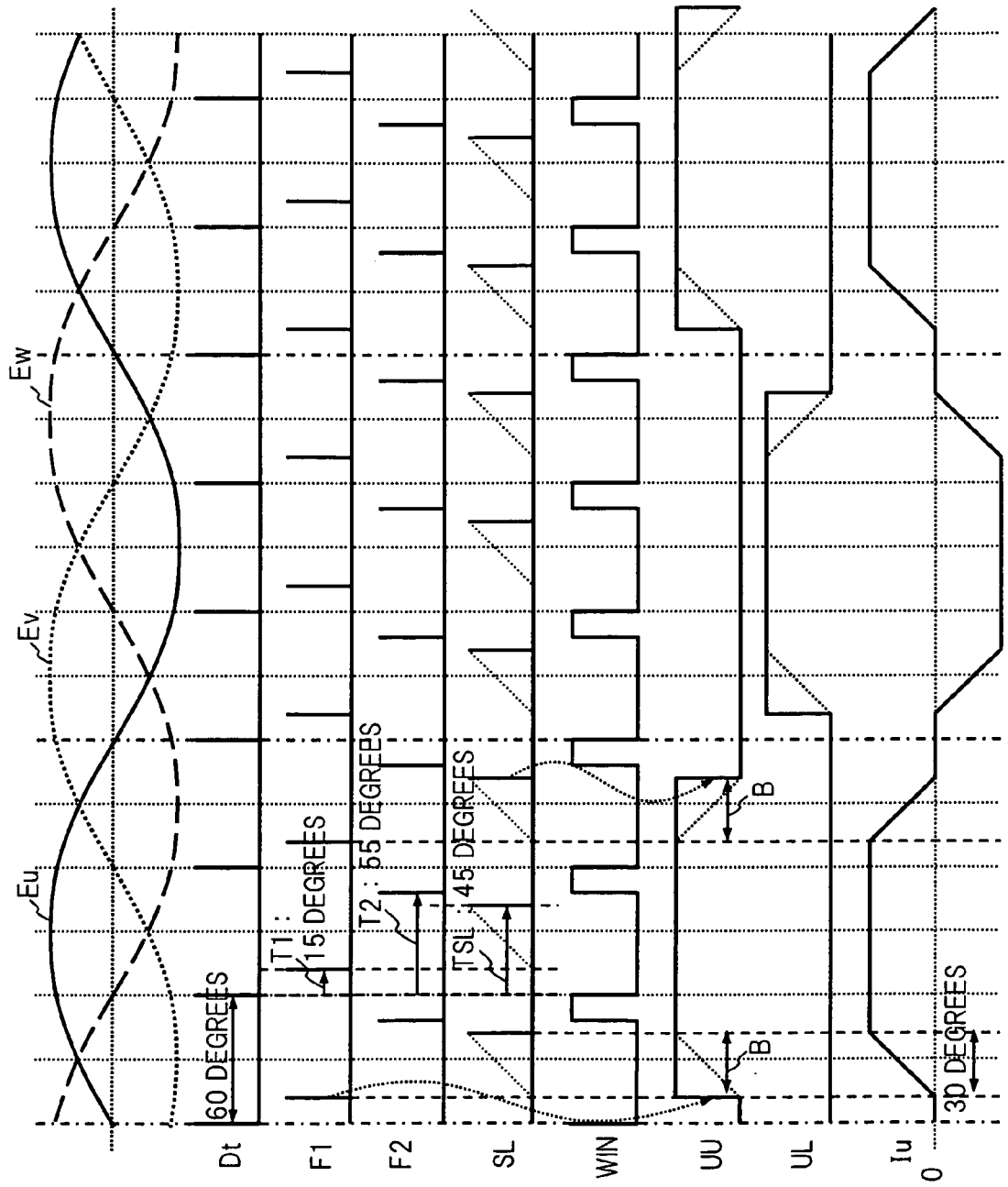
FIG. 17 is a timing chart showing operation of the activation controller in the motor driving apparatus of FIG. 15 in normal times.

FIG. 17 is a timing chart showing operation (only U-phase) of the activation controller 40A in normal times (the rotor rotating speed is a predetermined value or more). Since a V-phase and a W-phase are merely displaced from the U-phase by 120 and 240 electrical degrees, respectively, description thereof is omitted herein. The state determination signal SJ outputs the "H" level in normal times and the selecting circuit 42 of the activation controller 40 selects and outputs the position detection signal Dt. The time measuring circuit 43 measures time between the edges of the position detection signal Dt and loads the measured value "Data" to the first adjusting circuit 44, the second adjusting circuit 45 and the slope adjusting circuit 47. The loaded measured value "Data" is a time measured value corresponding to 60 electrical degrees and the first adjusting circuit 44 outputs the first adjustment pulse F1 after the first adjustment time T1 as a delay time corresponding to 15 electrical degrees from the edge of the position detection signal Dt. The second adjusting circuit 45 outputs the second adjustment pulse F2 after the second adjustment time T2 as a delay time corresponding to 55 electrical degrees from the edge of the position detection signal Dt. The slope adjusting circuit 47 outputs a slope adjustment pulse SL after a slope adjustment time TSL as a delay time corresponding to 45 electrical degrees from the edge of the position detection signal Dt. In synchronization with the second adjustment pulse F2, the state of the detection window signal WIN changes to the "H" level, thereby enabling position detecting operation of the position detector 30. Simultaneously with position detection (detection of zero-crossing of the back electromotive force in each phase), the state of the detection window signal WIN changes to the "L" level.

The high-side activation control signals UU, VU and WU and the low-side activation control signals UL, VL and WL are pulse signals of 150-degree activation which are generated from the first adjustment pulse F1 and the slope adjustment pulse SL. In FIG. 17, the PWM signal of the switching controller 80 is superimposed on the high-side and low-side activation control signals UU and UL in practice. At this time, in a period indicated by B in FIG. 17 (period of 30 electrical degrees from the first adjustment pulse F1 to the slope adjustment pulse SL), PWM driving is performed so that a drive current Iu has a waveform like a trapezoidal wave for slope control. There are various slope control methods and since it is unnecessary to define the method specifically in the present invention, description thereof is omitted.

As described above, by performing PWM driving by using slope control, PWM sensorless driving of the motor 10 is carried out so that waveform of the drive current is formed like a trapezoidal wave. The output timing of the second adjustment pulse F2 is delayed by 10 electrical degrees with respect to the slope adjustment pulse SL in order to mask the influence of kickback noise generated at activation switching and the like.

Although Embodiment 4 describes 150-degree activation including a slope period of 30 electrical degrees, the present invention is not limited to this and if only a non-activation period enough to perform position detection is secured, the slope period can be made shorter or longer. Although the output timing of the second adjustment pulse F2 is set to be 10 electrical degrees from the slope adjustment pulse SL, the present invention is not limited to this and any value can be set. Further, although the output timing of the first adjustment pulse F1 is set to be 15 electrical degrees (optimal phase in terms of efficiency), the present invention is not limited to this and any value can be set.

As described above, in the motor driving apparatus in accordance with Embodiment 4, by forming waveform of the drive current like a trapezoidal wave, vibration and acoustic noise due to the waveform of the drive current can be reduced.

Figure 18:
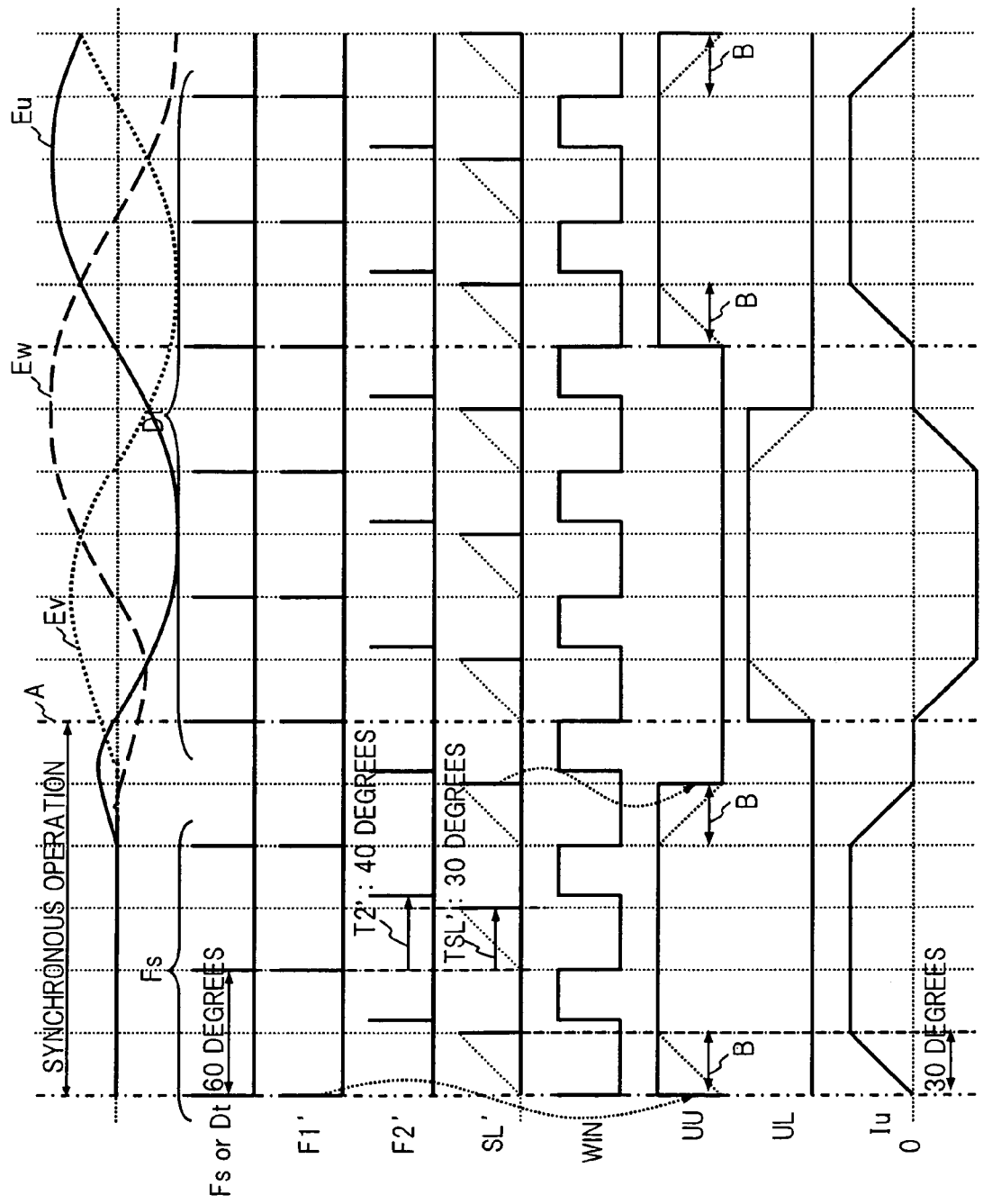
FIG. 18 is a timing chart showing operation of the activation controller in the motor driving apparatus of FIG. 15 at the time of starting.

Next, operation of the activation controller 40A at the time of starting (period from the beginning of starting to the time when the rotor rotating speed reaches the predetermined value) will be described. FIG. 18 is a timing chart showing operation of the activation controller 40A (only U-phase) at the time of starting.

Immediately after the beginning of starting, the state determination signal SJ outputs the "L" level and the selecting circuit 42 selects and outputs the synchronization signal Fs of a constant cycle. The time measuring circuit 43 measures time between the edges of synchronization signal Fs and loads the measured value "Data" to the first adjusting circuit 44, the second adjusting circuit 45 and the slope adjusting circuit 47. The loaded measured value "Data" is a measured value corresponding to 60 electrical degrees and the first adjusting circuit 44 sets the first adjustment time T1 to 0 and outputs the first adjustment pulse F1' at the same timing as the edge of the synchronization signal Fs. The second adjusting circuit 45 outputs the second adjustment pulse F2' after the second adjustment time T2' as a delay time corresponding to 40 electrical degrees from the edge of first adjustment pulse F1'. The slope adjusting circuit 47 outputs the slope adjustment pulse SL' after the slope adjustment time TSL' as a delay time corresponding to 30 electrical degrees from the edge of first adjustment pulse F1'. In synchronization with the second adjustment pulse F2', the state of the detection window signal WIN changes to the "H" level, thereby enabling position detecting operation of the position detector 30, and in synchronization with the edge of the synchronization signal Fs, the state of the detection window signal WIN changes to the "L" level.

The high-side activation control signals UU, VU and WU and the low-side activation control signals UL, VL and WL are pulse signals of 150-degree activation which are generated from the first adjustment pulse F1' and the slope adjustment pulse SL'. In FIG. 18, the PWM signal of the switching controller 80 is superimposed on the high-side and low-side activation control signals UU and UL in practice. At this time, as in normal times, in a period indicated by B in FIG. 18 (period of 30 electrical degrees from the first adjustment pulse F1' to the slope adjustment pulse SL'), PWM driving is performed so that the drive current Iu has a waveform like a trapezoidal wave for slope control. In this manner, immediately after the beginning of starting, by generating the activation control signal by the first adjustment pulse F1' and the slope adjustment pulse SL' generated by the synchronizing signal Fs and performing PWM driving by using slope control, the motor 10 is forced to perform synchronous operation so that waveform of the drive current is formed like a trapezoidal wave.

When the position detector 30 outputs the position detection signal Dt with synchronous operation of the motor 10 (refer to a point A in FIG. 18), the selecting circuit 42 switches the synchronization signal Fs to the position detection signal Dt and outputs it. Since the state determination signal SJ remains in "L" level at this time, like the operation immediately after the beginning of starting, the first adjusting circuit 44 sets the first adjustment time T1 to 0 and outputs the first adjustment pulse F1' at the same timing as the edge of the position detection signal Dt, and the second adjusting circuit 45 outputs the second adjustment pulse F2' after the second adjustment time T2' as a delay time corresponding to 40 electrical degrees from the edge of first adjustment pulse F1'. The slope adjusting circuit 47 outputs the slope adjustment pulse SL' after the slope adjustment time TSL' as a delay time corresponding to 30 electrical degrees from the edge of first adjustment pulse F1'. In synchronization with the second adjustment pulse F2', the state of the detection window signal WIN changes to the "H" level, thereby enabling position detecting operation of the position detector 30 and in synchronization with the edge of the position detection signal Dt, the state of the detection window signal WIN changes to "L" level.

Even after the position detector 30 outputs the position detection signal Dt, the high-side activation control signals UU, VU and WU and the low-side activation control signals UL, VL and WL are pulse signals of 150-degree activation which are generated from the first adjustment pulse F1' and the slope adjustment pulse SL'. The PWM signal of the switching controller 80 is superimposed on the high-side and low-side activation control signals UU and UL shown in FIG. 18 in practice. At this time, as in normal times, in a period indicated by B in FIG. 18 (period of 30 electrical degrees from the first adjustment pulse F1' to the slope adjustment pulse SL'), PWM driving is performed so that the drive current Iu has a waveform like a trapezoidal wave for slope control.

After the position detection signal Dt is output in this manner, by generating the activation control signal by the first adjustment pulse F1' and the slope adjustment pulse SL' generated by the position detection signal Dt and performing PWM-driving by using slope control, PWM sensorless driving of the motor 10 is performed.

Also from the point A onward in FIG. 18, until the rotor rotating speed reaches a predetermined value, that is, until the state of the state determination signal SJ changes from the "L" level to the "H" level, similarly, activation is started by the first adjustment pulse F1' output at the same timing as the output of the selecting circuit 42.

As described above, the activation start timing of the activation control signals is set earlier by setting the first adjustment pulse F1 to F1', the second adjustment pulse F2 to F2' and slope adjustment pulse SL to SL' in the period from the beginning of starting to the time when the rotor rotating speed reaches a predetermined value, that is, when the state determination signal SJ has the "L" level. By advancing the activation start timing of the activation control signals in this manner, in the motor driving apparatus in accordance with Embodiment 4, leading phase activation control corresponding to 15 electrical degrees (FIG. 18) can be performed as compared with the activation start timing of activation control in normal times (FIG. 17).

In the motor driving apparatus in accordance with Embodiment 4, when the motor 10 is driven by PMW sensorless operation by leading phase activation control, the rotor rotating speed is accelerated and then, becomes a predetermined value or more. At this point, the state of the state determination signal SJ changes from the "L" level to the "H" level. When the state determination signal SJ changes to "H" level, as shown in FIG. 17, switching to activation control of the efficient and optimal phase is made to perform PWM sensorless driving.

In the motor driving apparatus in accordance with Embodiment 4, while controlling the waveform of the drive current to be formed like a trapezoidal wave from the beginning of starting to the normal time, leading phase activation control is performed in the period from the beginning of starting to the time when the rotor rotating speed reaches a predetermined value and leading phase activation control is switched to activation control in the optimum phase when the rotor rotating speed is the predetermined value or more to perform PWM sensorless driving. Accordingly, in the motor driving apparatus in accordance with Embodiment 4, it is possible to reduce vibration and acoustic noise due to the waveform of the drive current and shorten starting time.

Although the position detection signal Dt is defined as a pulse signal generated in every 60 electrical degrees in the motor driving apparatus in accordance with Embodiment 4, the present invention is not necessarily limited to this, activation control may be performed by using a pulse signal generated in every 120 electrical degrees or 360 electrical degrees. Although the state of the state determination signal SJ is changed using the predetermined rotor rotating speed as a threshold, the state of the state determination signal SJ may be changed in substantially proportional to the rotor rotating speed and accordingly the amount of leading phase may be cancelled substantially proportionately or gradually. Needless to say, by configuring the motor driving apparatus in Embodiment 4 as in Embodiments 2 and 3, stable PWM sensorless driving without start failure such as oscillation, loss of synchronism and reverse rotation can be achieved.

EMBODIMENT 5

Figure 19:
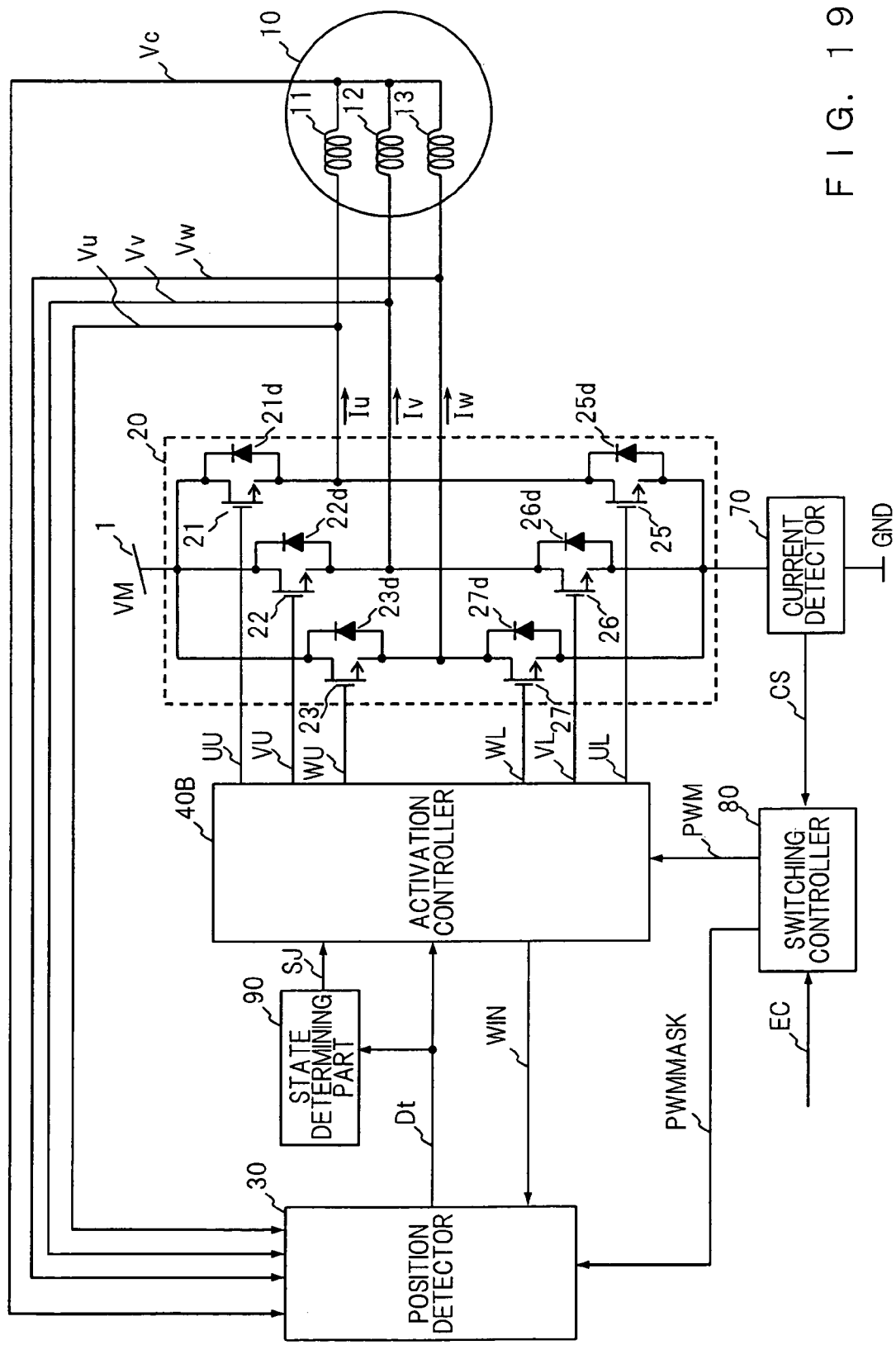
FIG. 19 is a block diagram showing a whole configuration of a motor driving apparatus in accordance with Embodiment 5 of the present invention.

FIG. 19 is a block diagram showing a configuration of a motor driving apparatus in accordance with Embodiment 5 of the present invention. The motor driving apparatus in accordance with Embodiment 5 is different from the above-mentioned Embodiment 1 in the configuration of an activation controller 40B and other configuration and operation are the same as those described in accordance with Embodiment 1.

The activation controller 40B has the substantially same configuration as the activation controller 40A (FIG. 16) and they are different from each other in operation of the slope adjusting circuit 47. Operation in normal times, that is, operation at the time when the state determination signal SJ has the "H" level (rotor rotating speed is a predetermined value or more) is the same as the operation in normal times in Embodiment 4.

Figure 20:
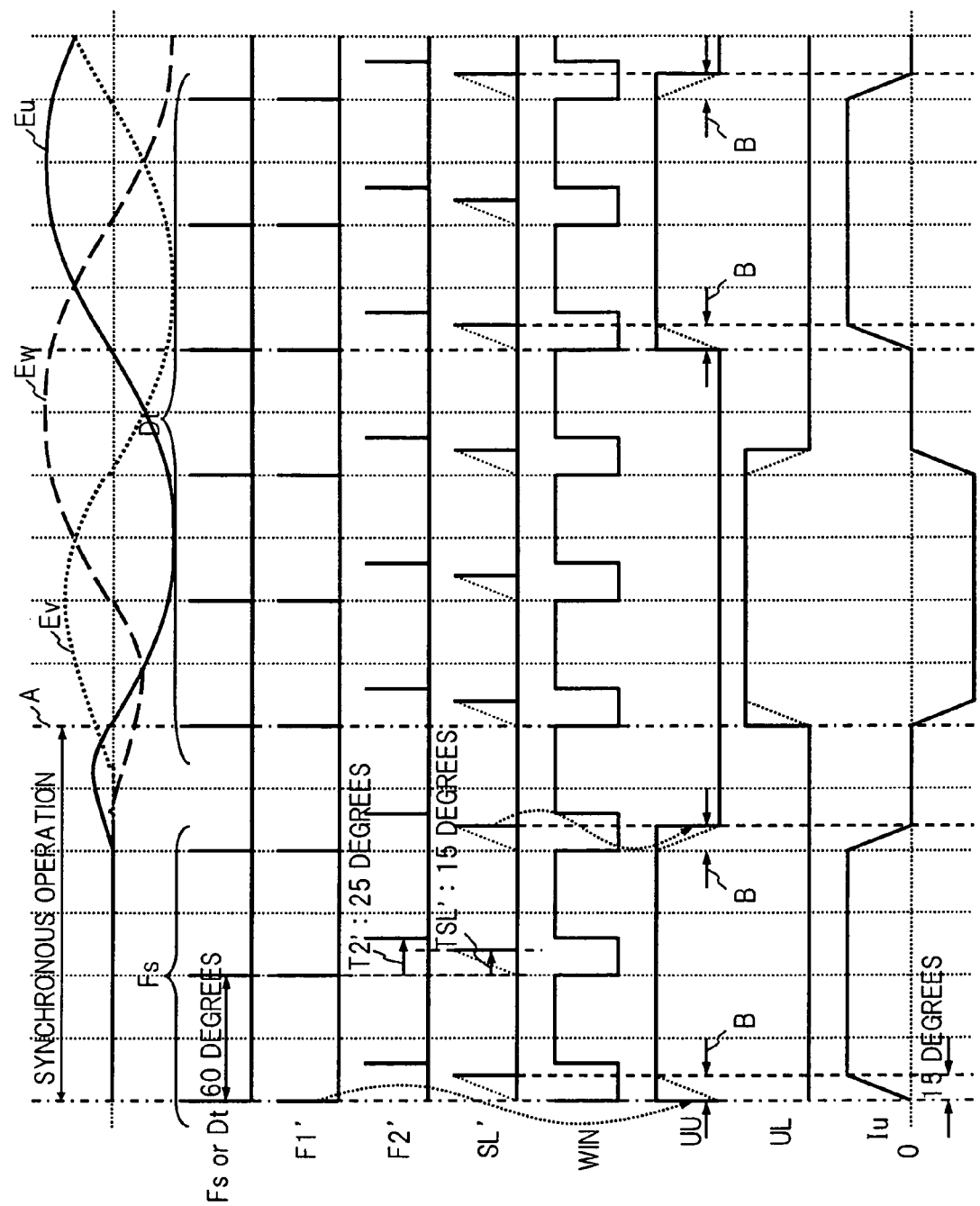
FIG. 20 is a timing chart showing operation of an activation controller in the motor driving apparatus of FIG. 19 at the time of starting.

FIG. 20 is a timing chart showing operation (only U-phase) of the activation controller 40B at starting (in the period from the beginning of starting to the time when the rotor rotating speed reaches a predetermined value). Immediately after the beginning of starting, the state determination signal SJ outputs the "L" level and the selecting circuit 42 selects and outputs the synchronization signal Fs of a constant cycle. The time measuring circuit 43 measures time between the edges of the synchronization signal Fs and loads the measured value "Data" to the first adjusting circuit 44, the second adjusting circuit 45 and the slope adjusting circuit 47. The loaded measured value "Data" is a time measured value corresponding to 60 electrical degrees and the first adjusting circuit 44 sets the first adjustment time T1 to and outputs the first adjustment pulse F1' at the same timing as the edge of the synchronization signal Fs. The second adjusting circuit 45 outputs the second adjustment pulse F2' after the second adjustment time T2' as a delay time corresponding to 25 electrical degrees from the edge of the first adjustment pulse F1'. The slope adjusting circuit 47 outputs a slope adjustment pulse SL' after a slope adjustment time TSL' as a delay time corresponding to 15 electrical degrees from the edge of the first adjustment pulse F1'. In synchronization with the second adjustment pulse F2', the state of the detection window signal WIN changes to the "H" level, thereby enabling position detecting operation of the position detector 30, and in synchronization with the edge of the synchronization signal Fs, the state of the detection window signal WIN changes to the "L" level.

The high-side activation control signals UU, VU and WU and the low-side activation control signals UL, VL and WL are pulse signals of 135-degree activation which are generated from the first adjustment pulse F1' and the slope adjustment pulse SL'. 135-degree activation means that the width of activation has an electrical angle of 135 degrees. In FIG. 20, the PWM signal of the switching controller 80 is superimposed on the high-side and low-side activation control signals UU and UL in practice. At this time, as in normal times, in a period indicated by B in FIG. 20 (period of 15 electrical degrees from the first adjustment pulse F1' to the slope adjustment pulse SL'), PWM driving is performed so that a drive current Iu has a waveform like a trapezoidal wave for slope control. In this manner, immediately after the beginning of starting, by generating the activation control signal by the first adjustment pulse F1' and the slope adjustment pulse SL' generated by the synchronizing signal Fs and performing PWM driving by using slope control, the motor 10 is forced to perform synchronous operation so that the waveform of the drive current is formed like a trapezoidal wave.

When the position detector 30 outputs the position detection signal Dt with synchronous operation of the motor 10 (refer to a point A in FIG. 20), the selecting circuit 42 switches the synchronization signal Fs to the position detection signal Dt and outputs it. Since the state determination signal SJ remains in "L" level at this time, like the operation immediately after the beginning of starting, the first adjusting circuit 44 sets the first adjustment time T1 to 0 and outputs the first adjustment pulse F1' at the same timing as the edge of the position detection signal Dt, and the second adjusting circuit 45 outputs the second adjustment pulse F2' after the second adjustment time T2' as a delay time corresponding to 25 electrical degrees from the edge of first adjustment pulse F1'. The slope adjusting circuit 47 outputs the slope adjustment pulse SL' after the slope adjustment time TSL' as a delay time corresponding to 15 electrical degrees from the edge of first adjustment pulse F1'. In synchronization with the second adjustment pulse F2', the state of the detection window signal WIN changes to the "H" level, thereby enabling position detecting operation of the position detector 30 and in synchronization with the edge of the position detection signal Dt, the state of the detection window signal WIN changes to "L" level.

Even after the position detector 30 outputs the position detection signal Dt, the high-side activation control signals UU, VU and WU and the low-side activation control signals UL, VL and WL are pulse signals of 135-degree activation which are generated from the first adjustment pulse F1' and the slope adjustment pulse SL'. In FIG. 20, the PWM signal of the switching controller 80 is superimposed on the high-side and low-side activation control signals UU and UL in practice. At this time, in a period indicated by B in FIG. 20 (period of 15 electrical degrees from the first adjustment pulse F1' to the slope adjustment pulse SL'), PWM driving is performed so that the drive current Iu has a waveform like a trapezoidal wave for slope control. In this manner, after the position detection signal Dt is output, by generating the activation control signal by the first adjustment pulse F1' and the slope adjustment pulse SL' generated by the position detection signal Dt and performing PWM driving by using slope control, PWM sensorless driving of the motor 10 is performed.

Also from the point A onward in FIG. 20, until the rotor rotating speed reaches a predetermined value, that is, until the state of the state determination signal SJ changes from the "L" level to the "H" level, similarly, activation is started by the first adjustment pulse F1' output at the same timing as the output of the selecting circuit 42.

As described above, in the motor driving apparatus in accordance with Embodiment 5, the activation start timing of the activation control signals is set earlier by setting the first adjustment pulse F1 to F1', the second adjustment pulse F2 to F2' and slope adjustment pulse SL to SL' in the period from the beginning of starting to the time when the rotor rotating speed reaches a predetermined value, that is, when the state determination signal SJ has the "L" level. Further, in the motor driving apparatus in accordance with Embodiment 5, in the period from the beginning of starting to the time when the rotor rotating speed reaches the predetermined value, slope control angle at starting is controlled smaller than that in normal times. Specifically, while the slope control angle in normal times is 30 electrical degrees (150-degree activation), the slope control angle at starting is 15 electrical degrees (135-degree activation). As described above, the motor driving apparatus in accordance with Embodiment 5 is different from the motor driving apparatus in accordance with Embodiment 4 in the slope control angle is controlled smaller.

As described above, by controlling the slope control angle at starting to be smaller and applying leading phase activation control, the motor driving apparatus of Embodiment 5 enables further leading phase activation control corresponding to 22.5 electrical degrees as compared to leading phase activation control corresponding to 15 electrical degrees in Embodiment 4.

Figure 21:
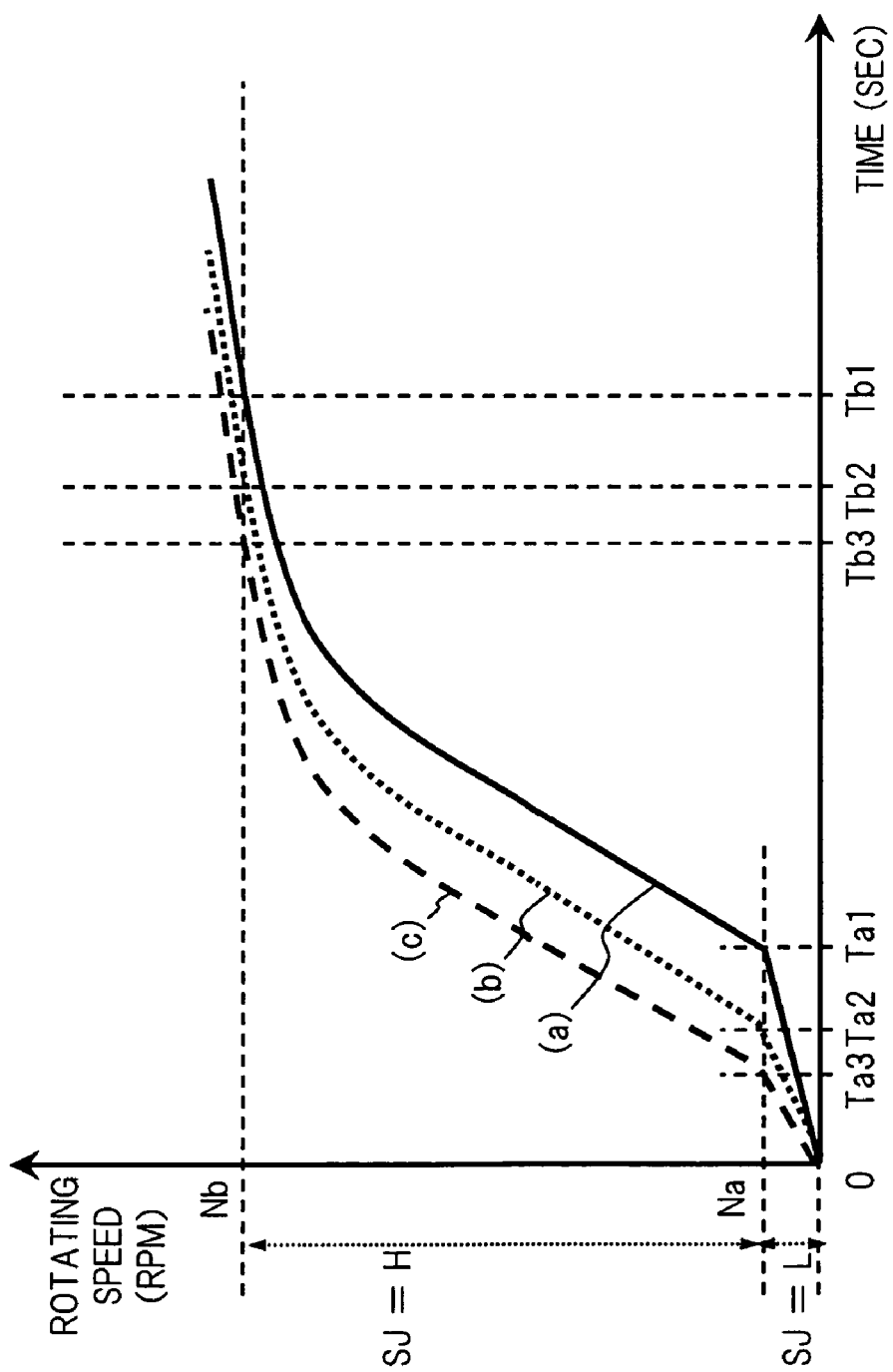
FIG. 21 is a starting characteristic diagram in the motor driving apparatus in accordance with Embodiment 5.
Figure 23:
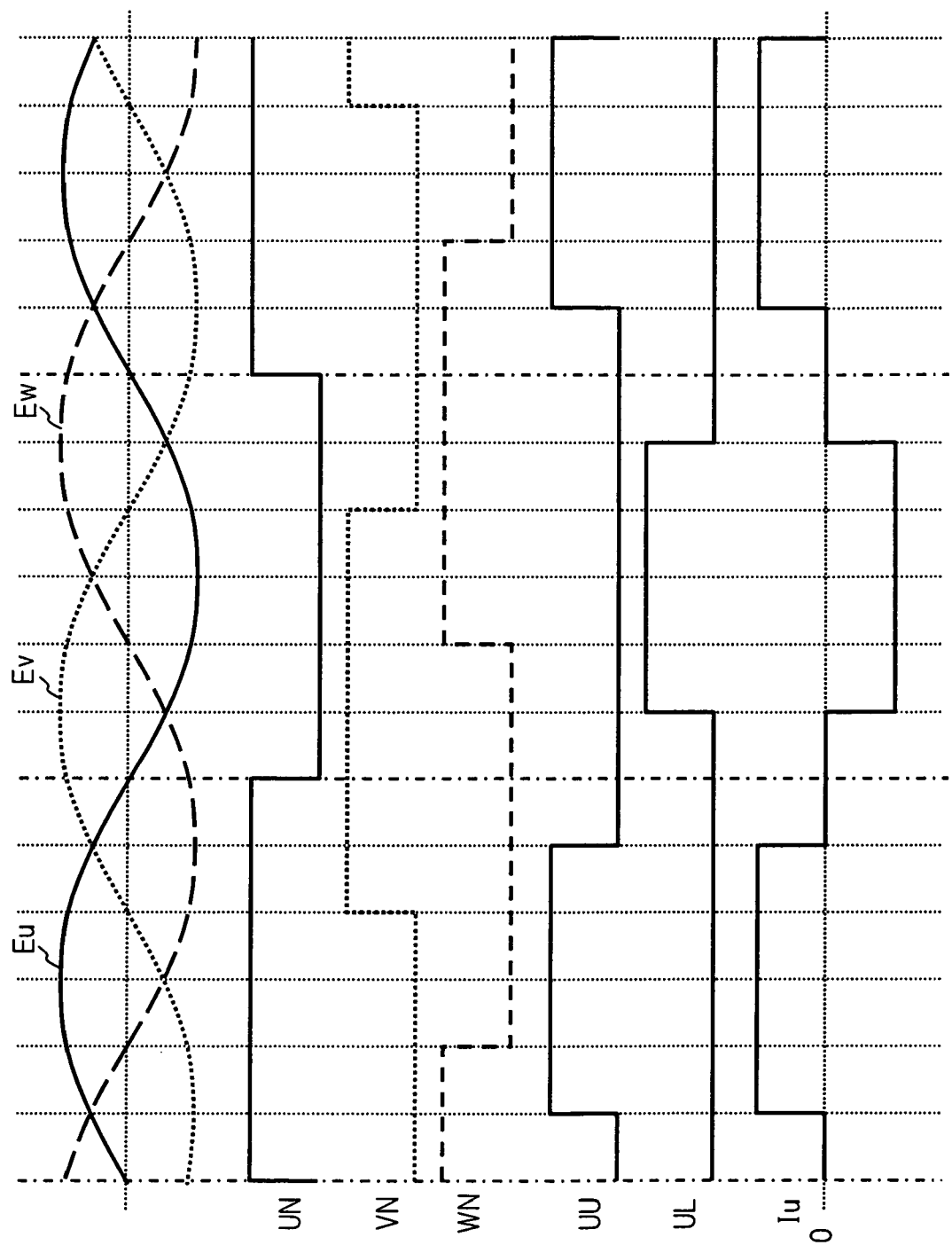
FIG. 23 is the timing chart showing operation of each part in the conventional motor driving apparatus of FIG. 22.

FIG. 21 is a view showing starting characteristics, a starting curve (a) represented by a solid line shows a starting characteristic in the case where leading phase activation control is not applied, a starting curve (b) represented by a short dashed line (dotted line) shows a starting characteristic in the case where leading phase activation control is applied as slope control angle is unchanged, and a starting curve (c) represented by a long dashed line shows a starting characteristic in the case where further leading phase activation control is applied by controlling slope control angle to be smaller.

In FIG. 21, a horizontal axis represents starting time [sec] and a vertical axis represents rotor rotating speed [rpm]. A value Na is a threshold of the rotor rotating speed which changes the state of the state determination signal SJ. In the region the rotor rotating speed is lower than the predetermined rotating speed Na, that is, the state determination signal SJ has the "L" level, the starting curve (b) shows the case where leading phase activation control is applied as slope control angle is unchanged, and the starting curve (c) shows the case where further leading phase activation control is applied by controlling slope control angle to be smaller. In the region the rotor rotating speed is the predetermined rotating speed Na or higher, that is, the state determination signal SJ has the "H" level, activation control of the optimum phase in terms of efficiency is performed in each case.

As shown in FIG. 21, the following relation: starting curve (a) <starting curve (b) <starting curve (c) holds for the gradient of speed change to the time in the region where the state determination signal SJ has the "L" level. From this fact, it is understood that by applying the configuration of Embodiment 5 with the starting characteristic represented by the starting curve (c), starting torque can be further improved, thereby further shortening starting time.

As described above, the motor driving apparatus in accordance with Embodiment 5 has the configuration in which PWM sensorless driving using further leading phase activation control is carried out by controlling the slope control angle to be smaller in the period from the beginning of starting to the time when the rotor rotating speed reaches the predetermined value. This enables further shortening starting time. By controlling waveform of the drive current to be formed like a trapezoidal wave, vibration and acoustic noise due to the waveform of the drive current can be reduced.

As a matter of course, the set value of the slope control angle is not limited to 15 electrical degrees as described in Embodiment 5 and when the slope control angle is set smaller than that in normal times, the effect of the present invention can be obtained. Further, the motor driving apparatus in accordance with Embodiment 5 may be configured so as to individually control the slope control angles of current waveform like a trapezoidal wave at the rising and falling sides of the slope, respectively. Needless to say, by configuring the motor driving apparatus in Embodiment 5 as in Embodiments 2 and 3, stable PWM sensorless driving without start failure such as oscillation, loss of synchronism and reverse rotation can be achieved.

Although the synchronization signal Fs has a constant cycle in the above-described Embodiments, the present invention is not necessarily limited to a constant cycle, and the synchronization signal Fs may have a variable cycle that shortens gradually. The present invention can make various modification to the configuration described in the above-described Embodiments without changing the contents and as a matter of course, such modified configuration is included in the spirit of the present invention.

The motor driving apparatus of the present invention has the effect of performing stable PWM sensorless starting without any starting failure such as oscillation, loss of synchronism and reverse rotation and shortening starting time, and therefore it is useful as a motor driving apparatus etc. for performing PWM sensorless driving.

Although the invention has been described in its preferred form with a certain degree of particularity, it is understood that the present disclosure of the preferred form has been changed in the details of construction and the combination and arrangement of parts may be resorted to without departing from the spirit and the scope of the invention as claimed.

The invention claimed is:

1. A motor driving apparatus that drives a motor having plural-phase windings and a rotor, the motor apparatus comprising:
a position detecting means for detecting position of said rotor according to a comparison signal obtained by comparing terminal voltages of said windings in a non-activation phase with a center tap voltage of a common potential of said plural-phase windings and outputting a position detection signal;
a state determining means for detecting the state of said rotor, and outputting the result obtained by comparing the position detection signal with a predetermined value;
an activation controlling means for performing activation control of said windings by setting a leading phase of an activation control signal with respect to said position detection signal when said state determining means outputs a first output signal, and performing activation control of said windings by canceling leading the leading phase of an activation control signal with respect to said position detection signal when said state determining means outputs a second output signal; and
a switching controlling means for outputting a drive signal for performing high-frequency switching control according to a command signal to said activation controlling means.

2. The motor driving apparatus in accordance with claim 1 further comprising a predetermined cycle OFF means for providing activation of said plural-phase windings with a predetermined cycle OFF period, wherein said position detecting means performs position detection in said predetermined cycle OFF period.

3. The motor driving apparatus in accordance with claim 1, wherein said position detecting means generates a reversal comparison signal obtained by reversing said comparison signal and performs position detection according to said reversal comparison signal in an ON period of high-frequency switching control.

4. The motor driving apparatus in accordance with claim 2 further comprising a state determining means for determining rotation state of said rotor, wherein said activation controlling means cancels leading phase according to an output of said determining means and stops predetermined cycle OFF operation of said predetermined cycle OFF means, and said position detecting means performs position detection in an ON period or OFF period of high-frequency switching control.

5. The motor driving apparatus in accordance with claim 3 further comprising a state determining means for determining rotation state of said rotor, wherein said activation controlling means cancels leading phase according to an output of said determining means, and said position detecting means performs position detection according to said comparison signal.

6. The motor driving apparatus in accordance with claim 1, wherein said state determining means determines whether or not a rotor, rotating speed obtained on the basis of said position detection signal exceeds a predetermined value.

7. The motor driving apparatus in accordance with claim 1, wherein said state determining means determines whether or not an electrical cycle of said activation control signal is output a predetermined number of time or more.

8. The motor driving apparatus in accordance with claim 1, wherein said activation controlling means cancels leading phase linearly or gradually according to an output of said state determining means.

9. The motor driving apparatus in accordance with claim 1, wherein said activation controlling means set a second leading phase smaller than the leading phase of said activation control signal with respect to said position detection signal when said state determining means outputs the first output signal, and the leading phase is canceled when said state determining means outputs the second output signal, and activation control in the second leading phase is performed.

10. The motor driving apparatus in accordance with claim 1, wherein said switching controlling means performs slope control and the waveform of a driving current flowing to said plural-phase windings forms a trapezoidal wave, the trapezoidal wave having a slope control angle at a rising side of a slope and a slope control angle at a falling side of a slope.

11. The motor driving apparatus in accordance with claim 10, wherein said activation controlling means sets the leading phase by controlling the slope control angles of a substantially trapezoidal waveform of a current flowing to said plural-phase windings at rising and falling sides of a slope, respectively, when said state determining means outputs the first output signal.

12. The motor driving apparatus in accordance with claim 10, wherein said activation controlling means sets leading phase by reducing a slope control angle of a substantially trapezoidal waveform of a current flowing to said plural-phase windings when said state determining means outputs the first output signal.

13. The motor driving apparatus in accordance with claim 12 further comprising a predetermined cycle OFF means for providing activation of said plural-phase windings with a predetermined cycle OFF period, wherein said position detecting means performs position detection in said predetermined cycle OFF period.

14. The motor driving apparatus in accordance with claim 12 wherein said position detecting means generates a reversal comparison signal obtained by reversing said comparison signal and performs position detection according to said reversal comparison signal in an ON period of high-frequency switching control.

15. The motor driving apparatus in accordance with claim 13 further comprising a state determining means for determining rotation state of said rotor, wherein said activation controlling means cancels leading phase according to an output of said state determining means and stops predetermined cycle OFF operation of said predetermined cycle OFF means, and said position detecting means performs position detection in an ON period or OFF period of high-frequency switching control.

16. The motor driving apparatus in accordance with claim 14 further comprising a state determining means for determining rotation state of said rotor, wherein said activation controlling means cancels leading phase according to an output of said determining means, and said position detecting means performs position detection according to said comparison signal.

* * * * *